US010911843B2

United States Patent
Yuang et al.

(10) Patent No.: US 10,911,843 B2
(45) Date of Patent: Feb. 2, 2021

(54) INTELLIGENCE-DEFINED OPTICAL TUNNEL NETWORK SYSTEM AND NETWORK SYSTEM CONTROL METHOD

(71) Applicant: DELTA ELECTRONICS, INC., Taoyuan (TW)

(72) Inventors: Maria Chi-Jui Yuang, Hsinchu (TW); Po-Lung Tien, Hsinchu (TW); Shao-Chun Wen, Taoyuan (TW); Tien-Chien Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/399,418

(22) Filed: Apr. 30, 2019

(65) Prior Publication Data
US 2019/0379951 A1 Dec. 12, 2019

Related U.S. Application Data

(60) Provisional application No. 62/683,037, filed on Jun. 11, 2018.

(30) Foreign Application Priority Data

Feb. 27, 2019 (CN) .......................... 2019 1 0146130

(51) Int. Cl.
*H04J 14/00* (2006.01)
*H04Q 11/00* (2006.01)
(Continued)

(52) U.S. Cl.
CPC ..... *H04Q 11/0003* (2013.01); *G06F 11/2033* (2013.01); *H04J 14/022* (2013.01);
(Continued)

(58) Field of Classification Search
CPC .......... H04Q 11/0003; H04Q 11/0005; H04Q 11/0062; H04Q 2011/0015;
(Continued)

(56) References Cited

U.S. PATENT DOCUMENTS

| 9,807,477 | B2 | 10/2017 | Yuang et al. |
| 2001/0026834 | A1 | 10/2001 | Sakano et al. |

(Continued)

FOREIGN PATENT DOCUMENTS

| CN | 101162949 | 4/2008 |
| CN | 101043267 | 5/2010 |

(Continued)

OTHER PUBLICATIONS

Maria C. Yuang et al., "OPMDC: Architecture Design and Implementation of a New Optical Pyramid Data Center Network," Journal of Lightwave Technology, vol. 33, No. 10, pp. 2019-2031, 2015.
(Continued)

*Primary Examiner* — Mohammad R Sedighian
(74) *Attorney, Agent, or Firm* — Hauptman Ham, LLP

(57) ABSTRACT

An intelligence-defined optical tunnel network system includes multiple Optical Switch Interconnect Sub-systems (OSIS), in which a first OSIS is configured to transmit a first lateral transmission optical signal via a first line to a second OSIS, and transmit a second lateral transmission optical signal via a second line to the second OSIS. The second OSIS includes a failover sub-module and a micro-control unit. The failover sub-module is configured to output one of the first and the second lateral transmission optical signal based on a selective signal. The micro-control unit is configured to output the selective signal to the failover sub-module to control the failover sub-module output the second
(Continued)

lateral transmission optical signal if a signal intensity of the first lateral transmission optical signal is lower than a threshold value.

20 Claims, 20 Drawing Sheets

(51) Int. Cl.
 *G06F 11/20* (2006.01)
 *H04J 14/02* (2006.01)
(52) U.S. Cl.
 CPC ...... *H04J 14/0205* (2013.01); *H04J 14/0209* (2013.01); *H04Q 11/0005* (2013.01); *H04Q 11/0062* (2013.01); *H04Q 2011/0015* (2013.01); *H04Q 2011/0081* (2013.01); *H04Q 2011/0088* (2013.01)
(58) Field of Classification Search
 CPC .... H04Q 2011/0081; H04Q 2011/0088; G06F 11/2033; H04J 14/0205; H04J 14/0209; H04J 14/022
 USPC .......................................................... 398/45
 See application file for complete search history.

(56) References Cited

U.S. PATENT DOCUMENTS

| | | | |
|---|---|---|---|
| 2013/0071104 A1* | 3/2013 | Nakashima | H04J 14/0283 398/3 |
| 2015/0181317 A1 | 6/2015 | Yin et al. | |
| 2016/0277816 A1 | 9/2016 | Yuang et al. | |
| 2018/0098138 A1 | 4/2018 | Frankel et al. | |

FOREIGN PATENT DOCUMENTS

| | | |
|---|---|---|
| CN | 101895463 | 11/2010 |
| CN | 101321031 | 12/2011 |
| CN | 102291182 | 12/2011 |
| CN | 102638411 | 8/2012 |
| CN | 105099556 | 11/2015 |
| CN | 105915279 | 8/2016 |
| JP | 2013-070123 | 4/2013 |
| TW | 201635733 | 10/2016 |
| TW | I552536 | 10/2016 |
| WO | WO2006035481 | 5/2008 |
| WO | WO2015003746 | 1/2015 |

OTHER PUBLICATIONS

Francesco Testa and Lorenzo Pavesi (Editors), "Optical Switching in Next Generation Data Centers," New York, NY, USA: Springer, 2018.

Cisco Data Center Spine-and-Leaf Architecture: Design Overview White Paper (2016). [Online]. Available:https://www.cisco.com/c/en/us/products/collateral/switches/nexus-7000-series-switches/white-paper-c11-737022.html.

Huber+suhner. Optical switch 7000 series. (2018). [Online]. Available: https://www.hubersuhner.com/en/solutions/wan-access-network/products/optical-switches/optical-switch-7000-series.

Y. Yin, R. Proietti, X. Ye, C. Nitta, V. Akella, and S. Yoo, "LIONS: An AWGR-based low-latency optical switch for high-performance computing and data centers," IEEE J. Sel. Topics Quantum Electron., vol. 19, No. 2, Mar./Apr. 2013.

* cited by examiner

INTELLIGENCE-DEFINED OPTICAL TUNNEL NETWORK SYSTEM AND NETWORK SYSTEM CONTROL METHOD

RELATED APPLICATIONS

This application claims priority to U.S. Provisional Application Ser. No. 62/683,037, filed Jun. 11, 2018, and China Application Serial Number 201910146130.9, filed Feb. 27, 2019, which are herein incorporated by reference.

BACKGROUND

Data Center Networks (DCNs) are utilized in cloud data centers or edge data centers to provide a reliable and efficient network structure, which is able to support various applications and services which are cloud-based, edge-based or enterprise-orientated, such as cloud computing, edge computing, data storage, data mining, social networking, etc.

In a Data Center Network utilizing conventional electrical switches for data exchanging, a transmission rate of the Data Center Network will be limited by data exchanging capability of the conventional electronic switches. In addition, the process of data transmission in the Data Center Network involves a lot of Optical-Electrical conversions and Electrical-Optical conversions, which will cause a heavy power consumption. The conventional electronic switches also require a lot of computation to determine how to route packets during the data transmission. The computation performed by the conventional electronic switches consumes a lot of power, increase latency of data transmission and raise a cost to cool down the Data Center Network system. Furthermore, when a system structure of the conventional electronic switches is formed and fixed it is difficult to upgrade the system structure in order to support more racks or servers with higher performance. In order to increase a transmission rate of the Data Center Network utilizing the conventional electronic switches, the existed electronic switches are required to be replaced or upgraded, such that it causes a higher cost to establish or maintain the Data Center Network utilizing the conventional electronic switches.

SUMMARY

The disclosure provides an intelligence-defined optical tunnel network system including a plurality of optical switch interconnect sub-systems. The plurality of optical switch interconnect sub-systems comprise a first optical switch interconnect sub-system and a second optical switch interconnect sub-system, wherein the first optical switch interconnect sub-system transmits a corresponding first lateral transmission optical signal to the second optical switch interconnect sub-system through a first line and a corresponding second lateral transmission optical signal to the second optical switch interconnect sub-system through a second line, and the second optical switch interconnect sub-system comprises a failover sub-module and a micro-control unit. The failover sub-module is configured to output one of the first lateral transmission optical signal and the second lateral transmission optical signal in response to a selective signal. When signal intensity of the first lateral transmission optical signal is lower than a threshold value, the micro-control unit is configured to output the selective signal to the failover sub-module in order to control the failover sub-module to output the second lateral transmission optical signal.

The disclosure further provides a network system control method, which includes steps of: transmitting a first lateral transmission optical signal from a first optical switch interconnect sub-system to a second optical switch interconnect sub-system through a first line, transmitting a second lateral transmission optical signal from the first optical switch interconnect sub-system to the second optical switch interconnect sub-system through a second line, when a signal intensity of the first lateral transmission optical signal is larger than a threshold value, outputting the first lateral transmission optical signal by a failover sub-module of the second optical switch interconnect sub-system, and when the signal intensity of the first lateral transmission optical signal is lower than the threshold value, outputting the second lateral transmission optical signal by the failover sub-module of the second optical switch interconnect sub-system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
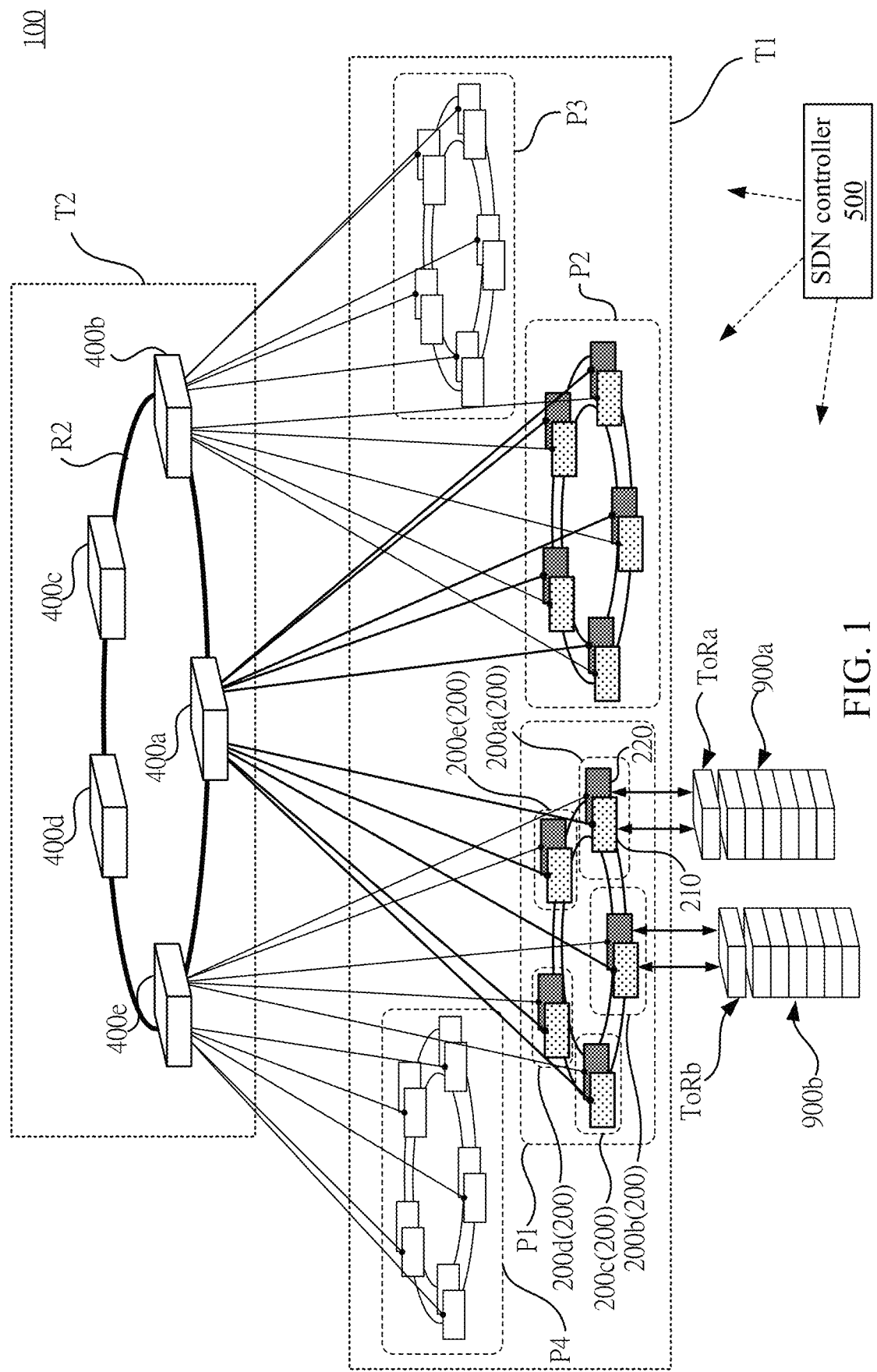
FIG. 1 is a schematic diagram of an intelligence-defined optical tunnel network system in accordance with some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "comprise," "comprising," "include," "including," "has," "having," etc. used in this specification are open-ended and mean "comprises but not limited." As used herein, the term "and/or" includes any and all combinations of one or more of the associated listed items.

In this document, the term "coupled" may also be termed "electrically coupled" and "coupled by optical fiber", and the term "connected" may be termed "electrically connected" and "connected by optical fiber". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. In this disclosure, mentioned terms 1×1, 1×2, 1×3, 2×1, 2×2, 5×1, 6×4 and N×M illustrate the amount of input terminals and the amount of output terminals such as 1 input and 1 output, 1 input and 2 outputs, 1 input and 3 outputs, 2 inputs and 1 output, 2 inputs and 2 outputs, 5 inputs and 1 output, 6 inputs and 4 outputs, and N inputs and M outputs respectively.

Please refer to FIG. 1. FIG. 1 is a schematic diagram of an intelligence-defined optical tunnel network system 100 in accordance with some embodiments of the present disclosure. In some embodiments, the intelligence-defined optical tunnel network system 100 can be applied to the intelligence-defined optical tunnel network system (OPTUNS) in the Edge Data Center for replacing the complicated, multi-tier and electrically-switching network system in the data center.

As shown in FIG. 1, in some embodiments, the intelligence-defined optical tunnel network system 100 includes a first tier network T1 and a second tier network T2. The first tier network T1 and the second tier network T2 can be interconnected by a single mode fiber. In some embodiments, the first tier network T1 and the second tier network T2 are optical switching networks respectively.

As shown in FIG. 1, in some embodiments, the first tier network T1 includes a plurality of pods, as the pods P1-P4 shown in the figure. In this embodiment, the pods P1-P4 are pods of optical nodes respectively. For ease of understanding and simplifying the description, some pods of the first tier network T1 is not shown in FIG. 1.

Any one of the pods P1-P4 in the first tier network T1 includes a plurality of optical add-drop sub-systems (OADS) 200a-200e as optical nodes. OADSs are configured to transmit data, through a plurality of Top of Rack (ToR) switches ToRa and ToRb respectively, with servers in a corresponding plurality of racks 900a and 900b. As shown in FIG. 1, in some embodiments, each pod P1-P4 includes five OADSs respectively. For ease of description, there are only two sets of ToR switches ToRa, ToRb and racks 900a, 900b illustrated in the diagram.

In practice, the remaining OADSs are also connected to their corresponding servers through the corresponding ToR switches in order to perform data transmission. Further, the amount of OADSs included in each pod P1-P4 can be adjusted according to the actual requirement. FIG. 1 is merely exemplary and the present disclosure is not limited thereto.

Taking the OADS 200a as an example, any one of the OADSs in the pod P1 includes a first transmission module 210 and a second transmission module 220. The first transmission module 210 is configured to perform data transmission at a first frequency band. The second transmission module 220 is configured to perform data transmission at a second frequency band differed to the first frequency band. In some embodiments, the first transmission module 210 and the second transmission module 220 are optical transmission module respectively. The first frequency band is a wavelength band in a specific wavelength range, and the second frequency band is another wavelength band in another specific wavelength range. As shown in FIG. 1, in the same pod P1, the first transmission module of any one of the OADS (i.e., OADS 200a) is connected to the first transmission modules 210 of the adjacent the OADS (i.e., OADS 200b) to form a first transmission ring. Similarly, the second transmission module of any one of the OADS (i.e., OADS 200a) is connected to the second transmission modules 220 of the adjacent the OADS (i.e., OADS 200b) to form a second transmission ring. In some embodiments, the first transmission modules 210 in the first transmission ring are connected to each other through an optical fiber, and the second transmission modules 220 in the second transmission ring are connected to each other through an optical fiber.

It should be noted that, in some embodiments, the first frequency bands configured in the first transmission modules of each OADSs 200a-200e in the same pod are different from each other, and the second frequency bands configured in the second transmission modules of each OADSs 200a-200e are different from each other. The detail of the module, frequency band configuration and specific operation of the OADSs 200a-200e will be described in the following paragraphs with the corresponding diagrams.

As shown in FIG. 1, in some embodiments, the second tier network T2 comprises a plurality of optical switch interconnect sub-systems (OSIS) 400a-400e as optical nodes. Structurally, any two of the OSISs 400a-400e transmits a corresponding lateral transmission optical signal through the corresponding first line to implement communication between each of the OSISs 400a-400e. In other words, the OSISs 400a-400e are interconnected to each other with optical fiber in a structure which is similar to the mesh network, so that the fiber network between any pair of OSISs 400a-400e and the fiber network between any other pair of the OSISs 400a-400e operate independently to each other. In some embodiments, the optical fiber network between the OSISs 400a-400e can be implemented with ribbon fiber. Therefore, the connection between the OSISs 400a-400e also appears to be a ring-shaped mesh structure R2 in outward expression.

The OSISs 400a-400e are configured to receive, respectively, optical signals from the OADS of the first tier network T1, after performing route switching and optical wavelength switching transit downwardly to another OADS of the first tier network T1.

A Software-defined network controller (SDN controller) 500 is configured to output corresponding control signals to each of the ToR switches ToRa, ToRb, the OADSs 200a-200e and the OSISs 400a-400e in order to build optical tunnels and schedule the optical tunnels. Thus, the data transmission in the system between each server can be implemented by utilizing optical signals through the optical fiber networks in the first tier network T1 and the second tier network T2.

It should be noted that the amounts of OSISs and of OADSs illustrated in FIG. 1 are merely exemplary and the present disclosure is not limited thereto. In various embodiments, the amount of OSISs 400a-400e and OADSs 200a-200e of the intelligence-defined optical tunnel network system 100 can be incrementally increased and/or decreased in accordance with the actual requirement and the normal operation of the intelligence-defined optical tunnel network system 100 is maintained. Therefore, the intelligence-defined optical tunnel network system 100 has a high degree of deployment flexibility.

As a result, in the intelligence-defined optical tunnel network system 100, by selecting a particular wavelength combination of the OSISs 400a-400e, the OADSs 200a-200e and the optical signals, the optical tunnel (that is, the optical path pluses optical wavelength combination) for data exchange between racks and racks can be established to achieve a ultra-low latency of data transmission.

In addition, in some embodiments, the dense wavelength division multiplexing (DWDM) technology can be applied in the intelligence-defined optical tunnel network system 100. By utilizing DWDM transceiver, various optical wavelengths can be used for transmitting data at the same time in the intelligence-defined optical tunnel network system 100.

However, intelligence-defined optical tunnel network system 100 in the present disclosure is not limited to DWDM technology. The intelligence-defined optical tunnel network system 100 may also be implemented with other wavelength division multiplexing (WDM) or other equivalent multiplexed optical transmission technology. In this way, the intelligence-defined optical tunnel network system 100 can achieve low latency, high bandwidth, low power consumption, and has better performance than the electrically-switching network system used in the existing data center.

For ease of description, the following paragraphs are the description with the relevant diagrams for the OADSs 200a-200e of the first tier network T1 and the design of its network structure, the OSISs 400a-400e of the second tier network T2 and the design of its network structure, the design of interconnect structure between the first tier network T1 and the second tier network T2, the design of protection path of the first tier network T1 and the design of protection path of the second tier network T2.

Figure 2:
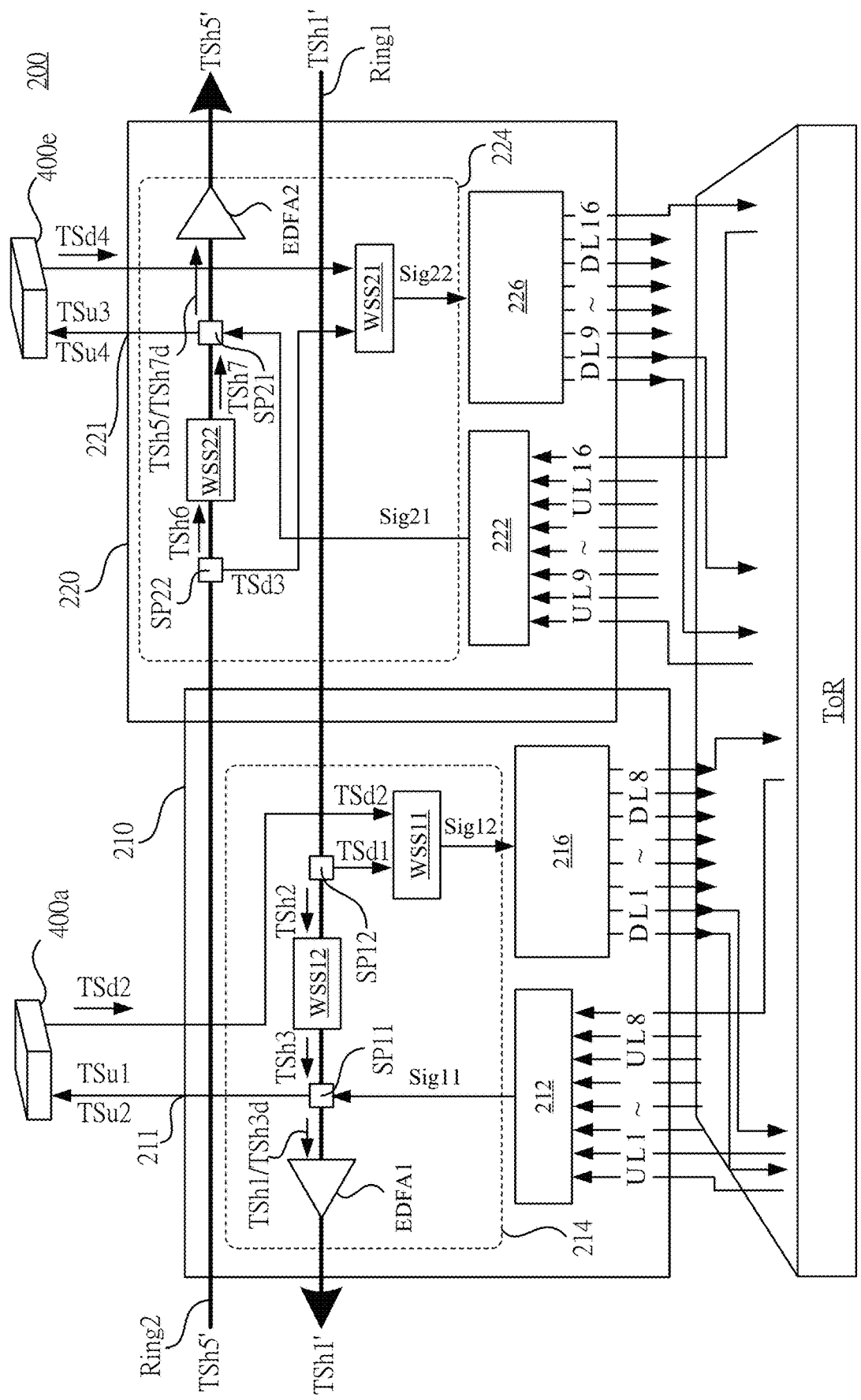
FIG. 2 is a schematic diagram of an optical add-drop sub-system (OADS) in accordance with some embodiments of the present disclosure.

Please refer to FIG. 2. FIG. 2 is a schematic diagram of the OADS 200 in accordance with some embodiments of the present disclosure. The OADS 200 is a core switch node for building optical tunnels between the racks of the first tier network T1 for data transmission. As shown in FIG. 2, the OADS 200 includes two or more independent transmission modules, such as a first transmission module 210 and a second transmission module 220. The first transmission module 210 and the second transmission module 220 use different wavelength band sequentially. In some embodiments, the wavelength bands used by the first transmission module 210 and the second transmission module 220 are adjacent to each other. Specifically, the wavelength band is a plurality of specific wavelength combinations arranged ascendingly by their frequency (i.e., frequency equals to the speed of light divided by wavelength).

As shown in FIG. 2, the first and second transmission modules 210 and 220, respectively, include multiplexers 212 and 222 as input sub-modules. In addition, the first and second transmission modules 210 and 220, respectively, include switching sub-modules 214 and 224 and demultiplexers 216 and 226 as output sub-modules. Specifically, the switching sub-module 214 in the first transmission module 210 includes a first splitter SP11, a second splitter SP12, an optical signal amplifier EFDA1, a first wavelength selective switch WSS11, and a second wavelength selective switch WSS12. Similarly, the switching sub-module 224 of the second transmission module 220 also includes a third splitter SP21, a fourth splitter SP22, an optical signal amplifier EFDA2, a third wavelength selective switch WSS21, and a fourth wavelength selective switch WSS22. The multiplexer 222 (the function and operation of which can be referred to the multiplexer 212 of the first transmission module 210 in the following embodiment), connected to the corresponding one of the ToRs, is configured to receive, through a plurality of add-ports, a plurality of second upstream optical signals (UL9-UL16) from the ToR switch, and combine the second upstream optical signals (UL9-UL16) into a second composite optical signal Sig21. The third splitter SP21 (the function and operation of which can be referred to the first splitter SP11 of the switching sub-module 214 in the following embodiment), deposited on the second transmission ring Ring2, is configured to receive and duplicate the second composite optical signal Sig21 as a fifth lateral transmission optical signal TSh5 and a third uplink transmission optical signal TSu3, transmit the fifth lateral transmission optical signal TSh5 through the second transmission ring Ring2 to the second transmission module 220 of another OADS in the same pod and transmit the third uplink transmission optical signal TSu3 through a second longitudinal port 221. The optical signal amplifier EFDA2 (the function and operation of which can be referred to the optical signal amplifier EFDA1 of the switching sub-module 214 in the following embodiment), deposited on the second transmission ring Ring2 and connected to the third splitter SP21, is configured to amplify the fifth lateral transmission optical signal TSh5 and output the amplified fifth lateral transmission optical signal TSh5' to the second transmission module 220 of another OADS in the same pod. The fourth splitter SP22 (the function and operation of which can be referred to the second splitter SP12 of the switching sub-module 214 in the following embodiment), deposited on the second transmission ring Ring2, is configured to receive and duplicate the fifth lateral transmission optical signal TSh5', received from the second transmission module 220 of another OADS in the same pod, as a third downlink transmission optical signal TSd3 and a sixth lateral transmission optical signal TSh6, and transmit the sixth lateral transmission optical signal TSh6 through the second transmission ring Ring2. The third wavelength selective switch WSS21 (the function and operation of which can be referred to the first wavelength selective WSS11 of the switching sub-module 214 in the following embodiment), coupled to the second transmission ring Ring2, is configured to receive the third downlink transmission optical signal TSd3 from the fourth splitter SP22 or receive a fourth downlink transmission optical signal TSd4 from the OSIS 400e, and selectively output the third downlink transmission optical signal TSd3 or the fourth downlink transmission optical signal TSd4. The fourth wavelength selective switch WSS22 (the function and operation of which can be referred to the second wavelength selective WSS12 of the switching sub-module 214 in the following embodiment), disposed on the second transmission ring Ring2, is configured to receive the sixth lateral transmission optical signal TSh6 and output a seventh lateral transmission optical signal TSh7 to the third splitter SP21. The third splitter SP21 is further configured to receive and duplicate the seventh lateral transmission optical signal TSh7 as an eighth lateral transmission optical signal TSh7d and a fourth uplink transmission optical signal TSu4, transmit through the second transmission ring Ring2 the eighth lateral transmission optical signal TSh7d, and transmit, through the second longitudinal port 221, the fourth uplink transmission optical signal TSu4 to the OSIS 400e. When the optical path from the OADS 200a to the OADS 200b on the first transmission ring Ring1 is cut off, the software-defined network controller 500 sets up correspondingly the ToR switch, the third wavelength selective switch WSS21 and the fourth wavelength selective switch WSS22 of the second transmission module 220 in order to build the optical tunnel from the OADS 200a to the OADS 200b on the second transmission ring Ring2.

The multiplexer 212 is as an input sub-module of the first transmission module 210. Similarly, the multiplexer 222 is as an input sub-module of the second transmission module 220. In structure, the multiplexer 212, 222 are connected to the one (i.e., ToR switch), corresponding to the OADS 200, of the ToR switches. The multiplexer 212, 222 having a plurality of add-ports, are configured to receive a plurality of first upstream optical signals UL1-UL8, a plurality of second upstream optical signals UL9-UL16, and combine the first upstream optical signals UL1-UL8 and the second upstream optical signals UL9-UL16 into a first composite optical signal Sigh 1 and a second composite optical signal Sig21.

Specifically, each add-port of the multiplexers 212 and 222 is coupled with optical fiber to a transmitter of the various DWDM transceivers on an input-output port of ToR switch in the rack, in which the DWDM transceiver is corresponding to the wavelength band of the add-port. In some embodiments, each add-port of the multiplexer 212 and 222 are configured to receive signals with a fixed wavelength. One add-port on the multiplexer 212 or 222 receives a signal with one specific wavelength.

As shown in FIG. 2, the first upstream optical signals UL1-UL8 have a plurality of wavelengths $\lambda 1$-$\lambda 8$ in the first frequency band respectively. Similarly, the second upstream optical signals UL9-UL16 have a plurality of wavelengths $\lambda 9$-$\lambda 16$ in the second frequency band respectively. In this way, the multiplexers 212 and 222 can receive, from the ToR switch, the optical signals of the wavelength band (i.e., wavelength $\lambda 1$-$\lambda 8$ and $\lambda 9$-$\lambda 16$) configured in the first transmission module 210 and the second transmission module 220, and combine the different optical wavelength signals into one optical fiber in order to be transmitted as the first composite optical signal Sig11 and the second composite optical signal Sig21.

The switching sub-module 214 of the first transmission module 210 includes the first splitter SP11, the optical signal amplifier EDFA1, the second splitter SP12, the first wavelength selective switch WSS11, and the second wavelength selective switch WSS12. Similarly, the second transmission module 220 of the switching sub-module 224 also includes the third splitter SP21, the optical signal amplifier EDFA2, the fourth splitter SP22, the third wavelength selective switch WSS21, and the fourth wavelength selective switch WSS22.

The main function of the switching sub-modules 214 and 224 is to successively upload the first composite optical signal Sig11 and the second composite optical signal Sig21 transmitted from the input sub-module (i.e., the multiplexers 212 and 222) to the OSIS 400a and 400e in the second tier network T2 or transmit, to East or West, to the other OADS 200 in same pod, and switch the optical signals transmitted from the other OADS 200 in same pod to the input sub-module 216 and 226. For example, the OADSs in the pod P2 in FIG. 1 can transmit/receive the optical signals to/from the other four OADSs in the same pod P2. In the same principle, the OADSs in each pod in FIG. 1 can transmit/receive the optical signals to/from the other four OADSs in the same pod.

For ease of explanation, in the following paragraphs, the first transmission module 210 will be taken as an example to describe the operation of each component. The components in the second transmission module 220 and the operation of the second transmission module 220 are similar to the first transmission module 210, and thus are not described herein.

As shown in FIG. 2, in structure, the first splitter SP11, disposed on the first transmission ring Ring1, is configured to receive and duplicate the composite optical signal SP11 as a first lateral transmission optical signal TSh1 and a first uplink transmission optical signal TSu1, transmit through the first transmission ring Ring1 the first lateral transmission optical signal TSh1, and transmit, through the first longitudinal port 211, the first uplink transmission optical signal TSu1 to the OSIS 400a.

In some embodiments, the optical signal amplifier EDFA1 can be implemented with erbium-doped fiber amplifier (EDFA). The optical signal amplifier EDFA1, disposed on the first transmission ring Ring1 and coupled to the first splitter SP11, is configured to amplify the first lateral transmission optical signal TSh1 and output the amplified first lateral transmission optical signal TSh1' to the first transmission module 210 of other OADSs in the same pod. Therefore, in the embodiment shown in FIG. 2, the optical signal amplifier EDFA1 can amplify the power of the optical signal transmitted to the West to ensure that it has sufficient power to be transmitted to the destination, but the present disclosure is not limited in the direction of transmission to the West. In actual applications, the transmission direction can be adjusted according to the network configuration.

As shown in FIG. 2, in structure, the second splitter SP12 disposed on the first transmit ring Ring1, is configured to receive and duplicate a first lateral transmission optical signal TSh1', received from the first transmission module 210 of other OADSs 200 in the same optical node pod, as a first downlink transmission optical signal TSd1 and a second lateral transmission optical signal TSh2, and transmit the second lateral transmission optical signal TSh2 through the first transmission ring Ring1.

The first wavelength selective switch WSS11, coupled to the first transmission ring Ring1, configured to receive the first downlink transmission optical signal TSd1 from the second splitter SP12 or receive a second downlink transmission optical signal TSd2 from the OSIS 400a, and selectively output the first downlink transmission optical signal TSd1 or the second downlink transmission optical signal TSd2 as the composite optical signal Sig12 to the demultiplexer 216.

Specifically, the first wavelength selective switch WSS11 is a 2×1 (2 input and 1 output) wavelength selective switch, being configured to select specific wavelength signal to pass in order to output the corresponding optical signal to the demultiplexer 216. In some embodiments, the 2×1 wavelength selective switch can be implemented by including two 1×1 wavelength selective switches and one 2×1 combiner, integrating, through the combiner, two optical signals selected by two 1×1 wavelength selective switches and outputting the combined composite optical signal Sig12 to the demultiplexer 216 of the receiving sub-module.

The second wavelength selective switch WSS12, disposed on the first transmission ring Ring1, configured to receive the second lateral transmission optical signal TSh2 and output a third lateral transmission optical signal TSh3 to the first splitter SP1. The first splitter SP1 is further configured to receive and duplicate the third lateral transmission optical signal TSh3 as a fourth lateral transmission optical signal TSh3$d$ and a second uplink transmission optical signal TSu2. The fourth lateral transmission optical signal TSh3$d$ is transmitted through the first transmission ring Ring1 by the first splitter SP11 and the second uplink transmission optical signal TSu2 is transmitted through the first longitudinal port 211 by the first splitter SP11 to the OSIS 400a.

In other words, the first splitter SP11 is a 2×2 (2 input 2 output) splitter, and includes two input ports and two output ports, one of which is configured to receive the first composite optical signal Sig11. The first splitter SP11 is configured to duplicate the received first composite optical signal Sig11 to the two output ports. The other input port is configured to receive the third lateral transmitted optical signal TSh3. The first splitter SP11 is configured to duplicate the third lateral transmission optical signal TSh3 to the two output ports. One output port of the first splitter SP11 is configured to output the first lateral transmission optical signal TSh1 or the fourth lateral transmission optical signal TSh3$d$, and the other output port is configured to output the first uplink transmission optical signal TSu1 or the second uplink transmission optical signal TSu2. The second splitter SP12 is 1×2 (1 input and 2 output) splitter and duplicates and splits the first lateral transmission optical signal TSh1', received from the first transmission module 210 of other OADSs in the same optical node pod, into two beams. In the embodiment shown in FIG. 2, in which one as the second lateral optical transmission optical signal TSh2 is transmitted continually to the West to other OADSs in the same pod P1 and the other as the first downlink transmission optical signal TSd1 is transmitted downwardly to the optical receiving module (i.e., the demultiplexer 216). However, the present disclosure is not limited in the direction of transmission to the West. In actual applications, the transmission direction can be adjusted according to the network configuration.

The second lateral transmission optical signal TSh2 passes through the 1×1 second wavelength selection switch WSS12, and the second wavelength selection switch WSS12 selects the specific optical wavelength signal of the second lateral transmission optical signal TSh2 as the third lateral transmission optical signal TSh3. Then, through the first splitter SP11 duplicating and splitting, in the embodiment shown in FIG. 2, one optical signal as the fourth lateral transmission optical signal TSh3$d$ is transmitted continually to the West to the other OADSs in the same optical node pod, and the other optical signal as the second uplink transmission optical signal TSu2 is output to the corresponding OSIS 400a. However, the present disclosure is not limited in the direction of transmission to the West. In actual applications, the transmission direction can be adjusted according to the network configuration.

Figure 3A:
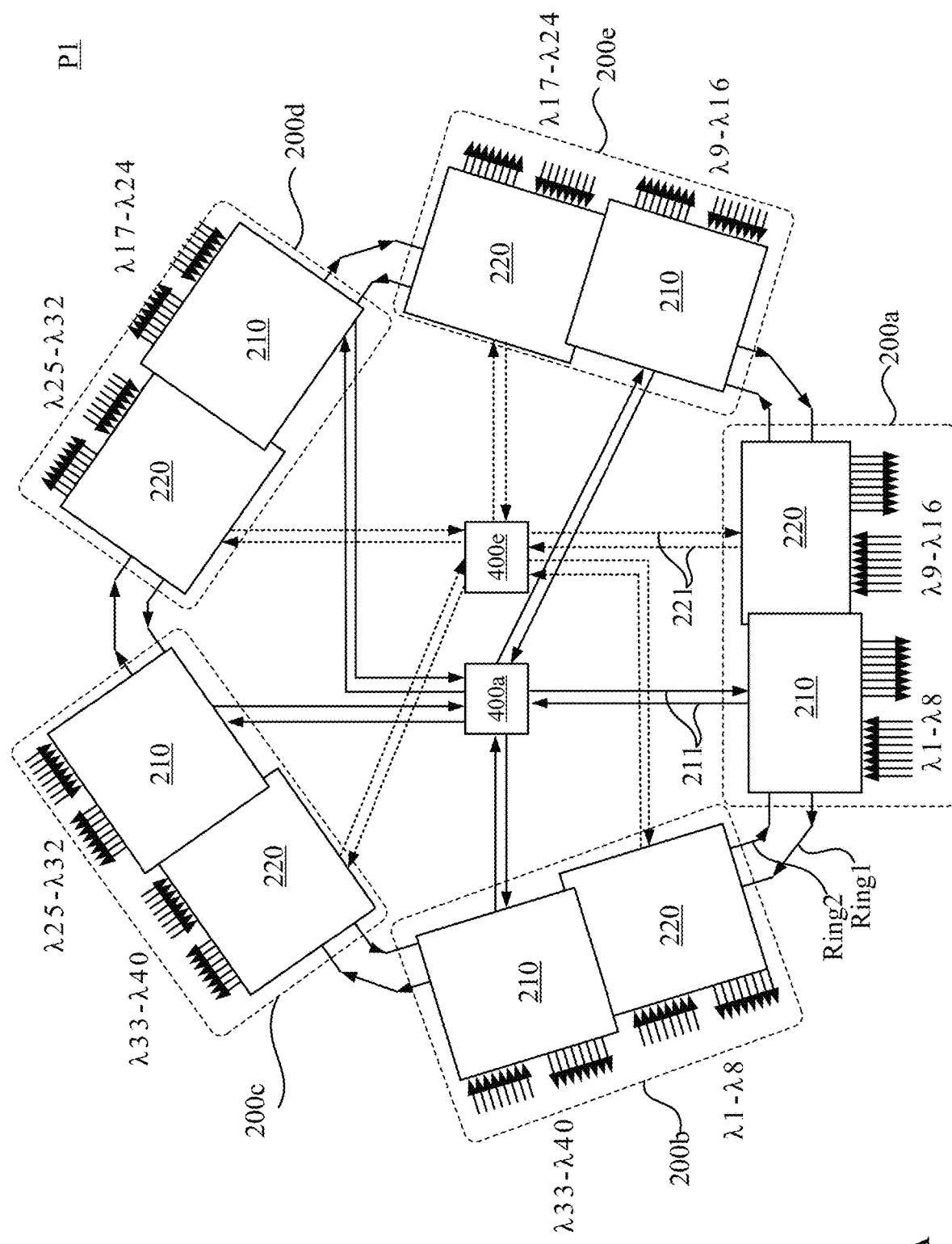
FIG. 3A is a connection relationship diagram of the transmission module of each OADS between the transmission module in the same pod in accordance with some embodiments of the present disclosure.

Please refer to the FIG. 3A together. FIG. 3A is a connection relationship diagram of the first transmission module 210 and the second transmission module 220 of each OADSs 200a-200e in the same pod in accordance with some embodiments of the present disclosure.

It should be noted that, as shown in FIG. 3A, in some embodiments, the first transmission module 210 and the second transmission module 220 of each of the OADSs 200a-200e transmit, through the first transmission ring Ring1 and the second transmission ring Ring2 respectively, the lateral transmission optical signals TSh1-TSh3 and TSh3$d$. The optical transmission directions in the first transmission ring Ring1 and the second transmission ring Ring2 are opposite to each other. For example, each of the first transmission modules 210 transmits signals in a Westward direction (i.e., a clockwise direction) with the first transmission ring Ring1, and each of the second transmission modules 220 transmits signals eastward (i.e., counter-clockwise direction) with the second transmission ring Ring2. But the disclosure is not limited thereto. In other embodiments, the first transmission ring Ring1 and the second transmission ring Ring2 can also transmit the lateral transmission optical signals TSh1-TSh3 and TSh3$d$ in the same optical transmission direction.

In addition, as shown in FIG. 3A, the first transmission module 210 of the OADSs 200a-200e are coupled to the OSIS 400a through a plurality of corresponding first longitudinal ports (shown by solid arrows in the figure) respectively. The second transmission module 220 of the OADSs 200a-200e are coupled to, through a plurality of corresponding second longitudinal ports (shown by dashed arrows in the figure), the OSIS 400e which is adjacent to the OSIS 400a.

Please refer back to FIG. 2 again. As shown in FIG. 2, the demultiplexer 216 and 226 are as output sub-modules of the OADS 200. Structurally, the demultiplexer 216 and 226 are coupled to, respectively, the first wavelength selective switch WSS11 and WSS21, connected to the corresponding one of the ToR switches, are configured to receive and demultiplex the first downlink transmission optical signal TSd1 or the second downlink transmission optical signal TSd2 as a plurality of downstream optical signals DL1-DL8 and DL9-DL16 and transmit the downstream optical signals DL1-DL8 and DL9-DL16 to the ToR switch.

Specifically, the demultiplexer 216 and 226 including cyclic DEMUX individually, are configured to receive the composite optical signal Sig12 and Sig 22, which include each wavelength, from the wavelength selective switch WSS11 and WSS21, and selectively filter the optical signals with a specific wavelength to pass to enter a corresponding drop-port. For example, it is assumed that the intelligence-defined optical tunnel system totally uses 40 kinds of wavelength (which are arranged in ascending frequency $\lambda1$-$\lambda40$), and each wavelength band includes eight wavelengths, each individual first transmission module 210 and second transmission module 220 including eight drop-ports. Therefore, The cyclic DEMUX having eight channels may arrange the coming at most 40 wavelengths in order according to the period, and select the wavelength signal, by the wavelength selective switch WSS11 and WSS21, to enter into the demultiplexer 216 and 226. The eight wavelengths selected by the wavelength selective switch WSS11 and WSS21 enter into, individually, the corresponding eight drop-ports of the demultiplexer 216 of the first transmission module 210, in which only one corresponding wavelength signal been selected enters each drop-port at the same time. For instance, in one embodiment, the wavelength configuration of the cyclic demultiplexer is shown in table 1 below:

TABLE 1

(Wavelength Configuration of the Cyclic Demultiplexer)

| Drop-port | received wavelength | | | | |
|---|---|---|---|---|---|
| 1 | $\lambda1$ | $\lambda9$ | $\lambda17$ | $\lambda25$ | $\lambda33$ |
| 2 | $\lambda2$ | $\lambda10$ | $\lambda18$ | $\lambda26$ | $\lambda34$ |
| 3 | $\lambda3$ | $\lambda11$ | $\lambda19$ | $\lambda27$ | $\lambda35$ |
| 4 | $\lambda4$ | $\lambda12$ | $\lambda20$ | $\lambda28$ | $\lambda36$ |
| 5 | $\lambda5$ | $\lambda13$ | $\lambda21$ | $\lambda29$ | $\lambda37$ |
| 6 | $\lambda6$ | $\lambda14$ | $\lambda22$ | $\lambda30$ | $\lambda38$ |
| 7 | $\lambda7$ | $\lambda15$ | $\lambda23$ | $\lambda31$ | $\lambda39$ |
| 8 | $\lambda8$ | $\lambda16$ | $\lambda24$ | $\lambda32$ | $\lambda40$ |

As shown in Table 1 in the present embodiment, the first wavelength of each wavelength band ($\lambda1$, $\lambda9$, $\lambda17$, $\lambda25$, $\lambda33$) enters into the first drop-port, the second wavelength ($\lambda2$, $\lambda10$, $\lambda18$, $\lambda26$, $\lambda34$) enters into the second drop-port, and so on. Each drop-port is connected to the optical fiber to a receiver of the DWDM transceivers on an input-output port of ToR switch in the rack, in which the DWDM transceiver is corresponding to the module wavelength band of the drop-port. For example, the first drop-port may be connected to the receiver of the DWDM transceiver with the first wavelength $\lambda1$ in the frequency band of the input-output port of ToR switch in the rack. In this way, each drop-port of the demultiplexer 216 and 226 can receive a plurality of optical signals with wavelength cyclic number.

Figure 3B:
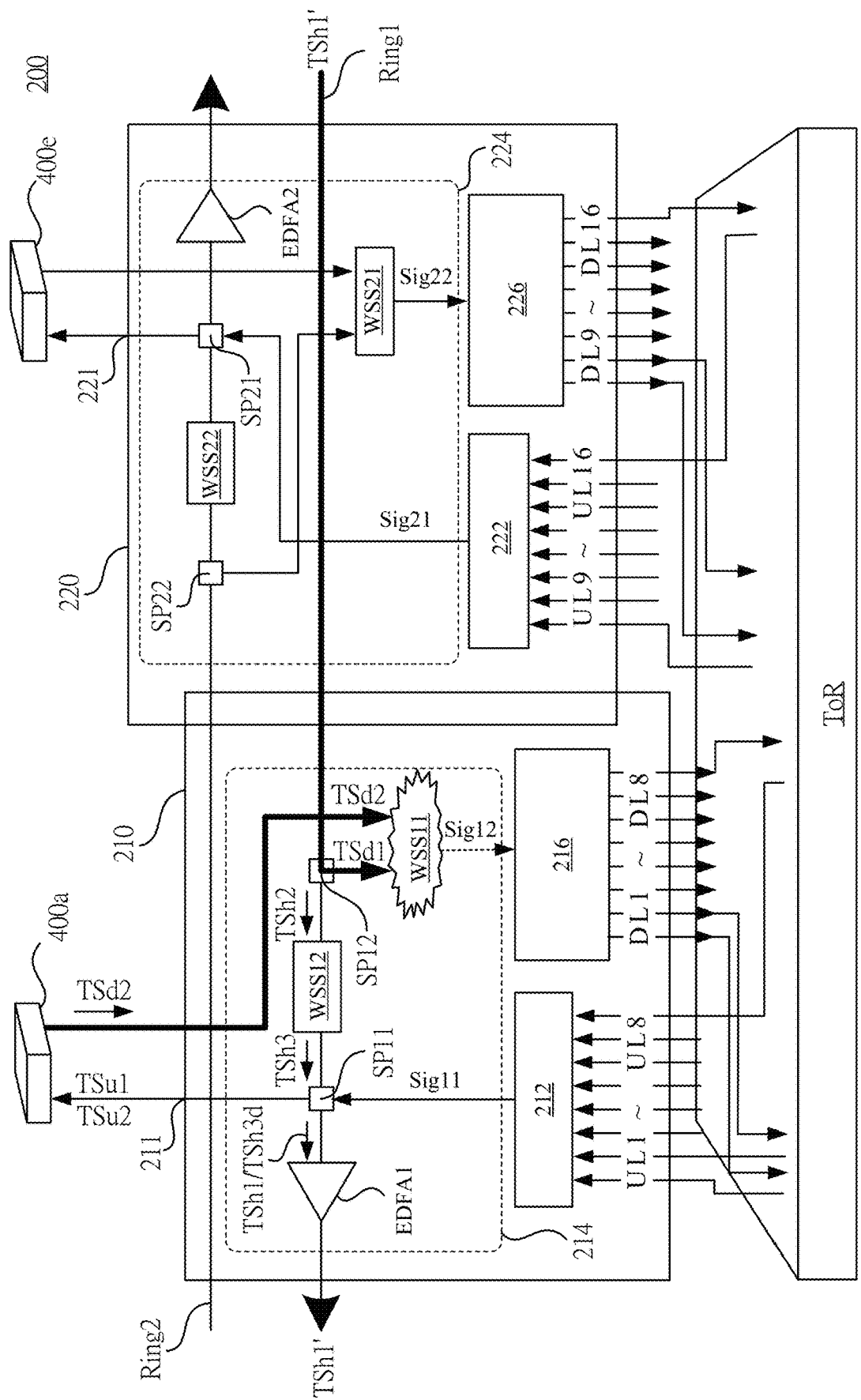
FIG. 3B and FIG. 3C are schematic diagrams of the conflict caused by a combiner and the conflict caused by a demultiplexer respectively.
Figure 3C:
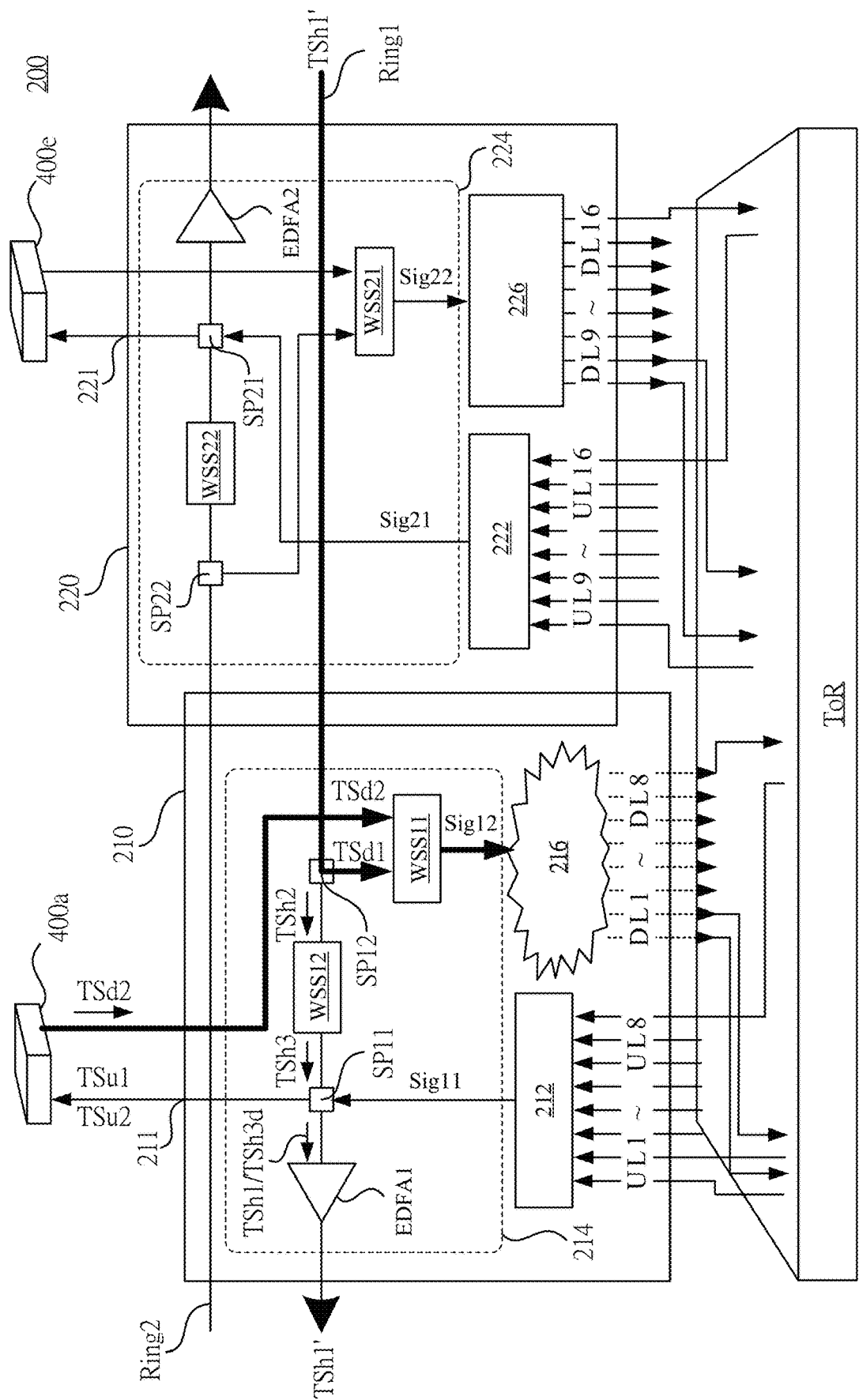

It should be noticed that, if the optical signals with the same wavelength are transmitted through the same optical fiber of the first transmission module 210 and the second transmission module 220 at the same time, the interference of signals may raise to cause conflict. Please refer to FIG. 3B and FIG. 3C together. FIG. 3B and FIG. 3C are schematic diagrams of the conflict caused by a combiner and the conflict caused by a demultiplexer respectively. As shown in FIG. 3B, when the first wavelength selective switch WSS11 receives the first downlink transmission optical signal TSd1 from the second splitter SP12, and receives the optical signals, including the same wavelength (i.e., $\lambda1$), in the second downlink transmitted optical signal TSd2 from the OSIS 400a, and if the two 1×1 wavelength selective switches in the 2×1 first wavelength selective switch WSS11 select $\lambda1$ to pass, the two optical signals with the wavelength $\lambda1$ may be combined simultaneously to one optical fiber through the 2×1 combiner and output to the demultiplexer 216 to cause conflict.

As shown in FIG. 3C, the second type of conflict is a conflict caused by the demultiplexer 216. Due to the design of the cyclic demultiplexer, each drop-port may receive five kinds of wavelength arranged according to the order of the wavelength cycle (shown in the preceding table 1). It is assumed that the first wavelength selective switch WSS11 receives the first downlink transmission optical signal TSd1 from the second splitter SP12, and the second downlink transmission optical signal TSd2 the OSIS 400a, and selects, respectively, the optical signal with wavelength $\lambda1$ in the first downlink transmission optical signal TSd1 and the optical signal with wavelength $\lambda9$ in the second downlink transmission optical signal TSd2 to pass. Even though the two beams with different wavelengths can be combined into one optical fiber as the composite optical signal Sig12 successfully and transmitted to the demultiplexer 216, after passing through the demultiplexer 216, the optical signal with wavelength $\lambda1$ and with wavelength $\lambda9$ may be introduced into the same drop-port (i.e., the first drop-port). Finally, the optical signal wavelength with $\lambda1$ and with wavelength $\lambda9$ may arrive at the same receiver of the DWDM transceiver. Because the receiver of the same DWDM transceiver can only receive one wavelength signal at the same time, otherwise the interference may occur. A conflict will occur at this point. Thus, in some embodiments, due to the design of the receiving of the demultiplexer 216, even two optical tunnels using different wavelengths $\lambda1$, $\lambda9$ may cause conflicts. Therefore, performing the tunnel scheduling control of the optical tunnel network through the software-defined network controller (SDN Controller) 500 is needed to prevent conflict conditions occur and optimize the utilization rate of the optical tunnel network.

The description above is for the internal modules and operations of the OADS 200. Then, the following paragraphs are the description for the design of the network structure of the interconnection of the OADSs 200a-200e to form the pod P1. Please refer to FIG. 3A again. As shown in FIG. 3A, the OADSs 200a-200e form a pod P1 with optical fiber connection in series. As described above, an amount of the OADSs 200a-200e being connected in series in one pod depends on the amount of wavelengths configured in each independent first transmission module 210 and a second transmission module 220 and the total amount of wavelength types supported by the intelligence-defined optical tunnel network system 100. The first transmission module 210 and the second transmission module 220 of each OADSs 200a-200e may be connected in series to the corresponding first transmission module 210 and the second transmission module 220 of adjacent OADS 200a-200e, forming a ring-shaped network. Therefore, a pod will include a plurality of independent ring networks.

The frequency band wavelength used by each transmission module (i.e., the first transmission module 210) belonging to the same transmission ring (i.e., the first transmission ring Ring1) cannot be repeated to each other and be arranged in counterclockwise ascendingly according to the wavelength frequency. In addition, because the transmission rings are independent of each other, the same wavelength can be reused on different rings. Alternately, in some embodiments, the types and amounts of wavelengths used on the first transmission ring Ring1 and the second transmission ring Ring2 are the same.

Taking structure of the pod P1 in FIG. 3A as an example, two optical fibers are used to connect in series the corresponding first transmission module 210 and the second transmission module 220 in the OADSs 200a-200e respectively. Among them the first transmission ring Ring1 transmits the optical signal to the West (i.e., a clockwise direction), and the second transmission ring Ring2 transmits the optical signal to the East (i.e., counterclockwise direction). The first transmission module 210 of the first OADS 200a in the first transmission ring Ring1 uses the frequency band including wavelength λ1-λ8. The first transmission module 210 of the next OADS 200e in the East uses the frequency band including wavelength λ9-λ16. The first transmission module 210 of the one after next OADS 200e in the East uses the frequency band including wavelength λ17-λ24, and so on.

It should be noticed particularly, the wavelength frequency band used by each second transmission module 220 in the second transmission ring Ring2 may be shifted and adjacent to the one used by the first transmission module 210. For example, the second transmission module 220 of the first OADS 200a uses wavelength λ9-λ16 (shifted and adjacent to the wavelength λ1-λ8 used by the first transmission module 210 of the OADS 200a). The second transmission module 220 of the next OADS 200e in the East uses wavelength λ17-λ24 (shifted and adjacent to the wavelength λ9-λ16 used by the first transmission module 210 of the OADS 200e). The second transmission module 220 of the one after the next OADS 200d in the East uses wavelength λ25-λ32, and so on. In other words, In the same pod P1, the first frequency band configured in the first transmission module 210 in the OADS 200a and the second frequency band configured in the second transmission module 220 in the OADS 200b include same wavelength combination.

Such a configuration allows each of the OADSs 200a-200e to support 16 wavelength bandwidths. The maximum amount of OADS 200 that can be connected in series in a pod P1 depends on the type of wavelength used by the system. Taking the structure in FIG. 1 as an example, assuming the intelligence-defined optical tunnel network system 100 supports a total of 40 kinds of wavelengths, then five independent series modules with different wavelength bands can be connected in series on an independent ring. It is equivalent to connecting five OADSs 200a-200e (as shown in FIG. 3A) in series in one pod P1.

In addition, the types and amounts of transmission wavelengths used in each of the transmission rings Ring1 and Ring2 are the same, so forty wavelengths (λ1-λ40) are used in the first transmission ring Ring1, and the second transmission ring Ring2 is also used λ1-λ40. In this ring-shape design structure, an OADSs 200a-200e can transmit the optical signals to East or West and receive the optical signals from the other OADS in the same pod P1.

In addition, the pod ring network structure includes two design features, which are the incremental structure design and feature of wavelength reuse. The specific content will be described in detail in the following paragraphs.

The spirit of the incremental structure design is manifested in two deployment modes. The first one is to gradually increase and concatenate the nodes of the required OADSs 200a-200e in a pod according to the required amount of racks. The second is to gradually increase the amount of independent transmission rings Ring1 and Ring2 in a pod P1.

For example, since the OADS utilizes a modular design, and each pod of the first tier network T1 utilizes a ring-shaped design structure, it is possible to connect different amounts of OADSs 200a-200e in one pod flexibly. In other words, as the demand increases, the required OADSs 200a-200e can be gradually added and concatenated in a pod according to the required amount of racks. For example, when the amount of required racks is small (i.e., three racks), there can be only three OADSs 200a-200c connected in a ring-shape series in pod P1. When the amount of required racks increases (i.e., five racks), the pod P1 can be expanded to include five OADSs 200a-200e in a ring-shaped series.

In addition, the amount of independent transmission rings Ring1 and Ring2 can be added in the same pod. For example, when the amount of servers in the rack increases or the bandwidth is upgraded, the network traffic load generated on behalf of the entire rack also rises relatively. There are two ways to solve this situation. The first method is that when the amount of wavelengths used by the OADSs 200a-200e is the same, based on a characteristic of data rate transparency of the intelligence-defined optical tunnel network system, the DWDM transceiver with higher speed data rate can be used instead to support the network traffic load generated on behalf of the increasing amount of the servers or the upgrade of the bandwidth. For example, the transmission speed of each wavelength may upgrade to from 10 Gbit/s to 100 Gbit/s to increase the flexibility of application of the system transmission rate and save the mass cost for upgrading hardware devices.

The second method is that when the transmission speed of wavelength is the same, the amount of transmission modules in the OADS 200 can be gradually increased to increase the amount of wavelengths that can be selectively used by the racks. Since the transmission modules are independent of each other, it is equivalent to gradually increasing the amount of transmission rings in one pod to support the network traffic load generated by the increase in the amount of servers in the rack or the bandwidth upgrade. An amount of independent transmission ring can be formed in one pod depends on the amount of wavelengths used by independent transmission modules and the type of wavelength used by the system. For example, when the intelligence-defined optical tunnel network system 100 uses 40 kinds of wavelength, one OADS 200 can include at most five independent modules with a different frequency band, using bands of λ1-λ8, λ9-λ16, λ17-λ24, λ25-λ32, and λ33-λ40 respectively. Correspondingly, one pod can form at most five transmission rings.

In other words, in some embodiments, any one of the OADS 200 may include N pieces of the transmission modules independent of each other; so that the OADSs in the same pod can be connected to each other through a respective N transmission rings. N transmission modules of one OADS 200 are coupled to two adjacent OSISs in the second tier network T2 through the corresponding optical paths. One of the N transmission modules of one OADS 200 may be coupled to, through the corresponding optical paths, the corresponding transmission modules of adjacent OADSs in the same optical node pod in the first tier network T1, in which the number N is a positive integer greater than or equal to two.

In summary, the two methods of the pod incremental structure design in the first tier network T1, by connecting in series the corresponding independent transmission modules in the nodes of the required OADS 200 with optical fiber to form a ring-shaped network structure, thus reduce the wiring complexity of system structure upgrade.

Further, as described in the previous paragraph, the same wavelength can be reused in the first tier network T1. This is the wavelength reusability feature in the first tier network T1. Specifically, wavelength reusability features are represented in two aspects of the network structure. First, a plurality of independent transmission ring Ring1 and Ring2 of each Pod may use the same wavelength combination repeatedly. Second, the intra-Pod optical signals of different pods can reuse the same wavelength combination repeatedly.

Every transmission ring in the same pod can use the optical signals with the same wavelength (i.e., $\lambda 1$) repeatedly to perform transmission. In different pods, optical signals with the same wavelength (i.e., $\lambda 1$) can be reused without conflict.

Through the design of the above network structure, a large number of inter-rack data transmission can be supported by using only a few wavelength types. Meanwhile, the restriction on that each type of wavelength in the optical fiber of the intelligence-defined optical tunnel network system 100 can be configured to transmit a corresponding optical signal to pass, and the upper limit (i.e., 40 kinds of wavelength) of the type of wavelength which can be used in whole network system can be conquered.

Figure 3D:
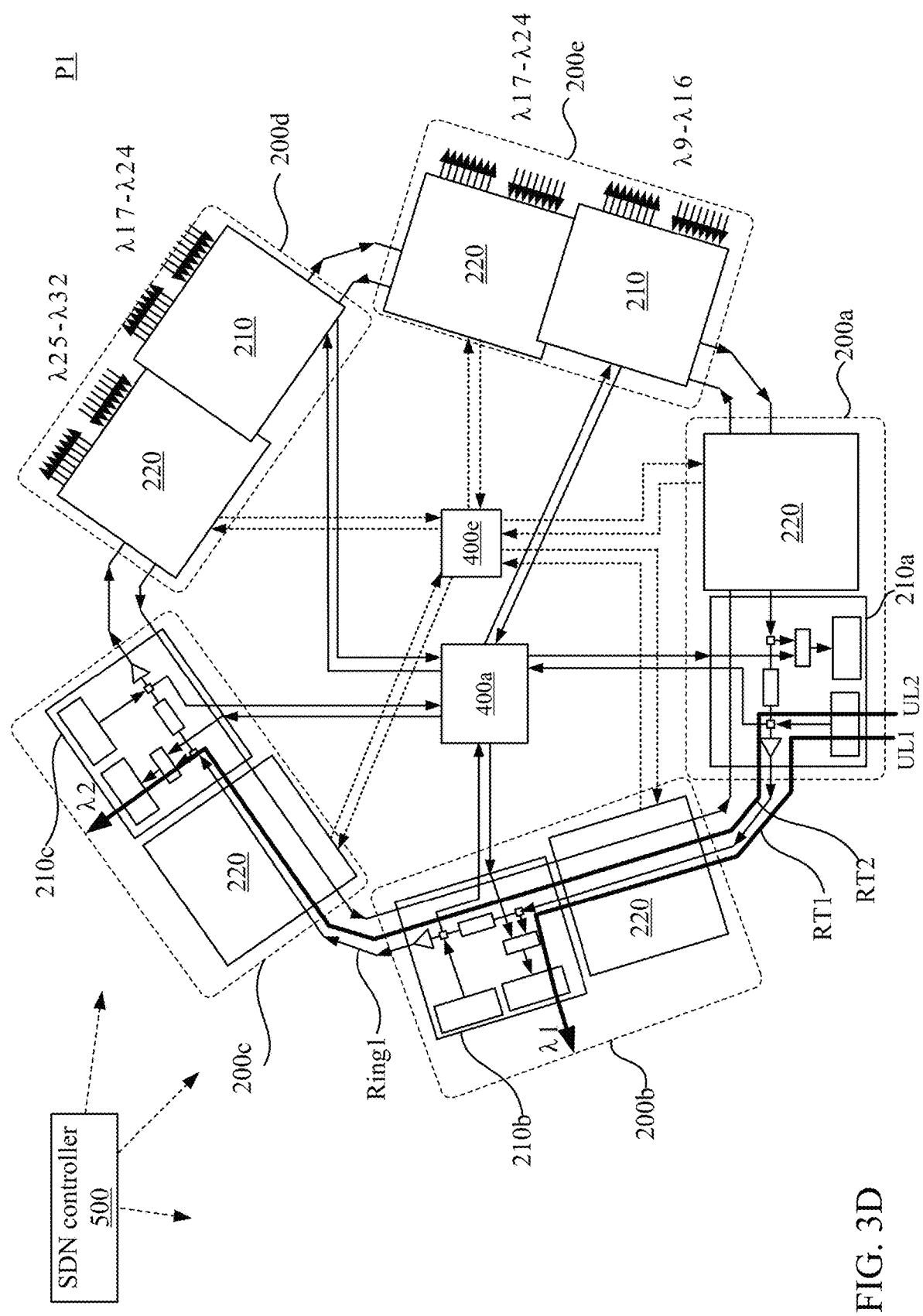
FIG. 3D is a schematic diagram of intra-Pods and the orientation of the optical signal in the pod in accordance with some embodiments of the present disclosure.

Please refer to FIG. 3D. FIG. 3D is a schematic diagram of intra-Pods and the orientation of the optical signal in the pod in accordance with some embodiments of the present disclosure. In the following paragraph, the required setting of the wavelength selective switch in the OADSs 200a-200e for building intra-Pod optical tunnels and the orientation of the optical signals will be described according to FIG. 3D.

As shown in FIG. 3D and FIG. 2, the unit corresponding to the OADS 200a would like to use the first transmission module 210 to transmit data to the unit corresponding to the OADS 200b in same pod P1 and the unit corresponding to the OADS 200c. In order to transmit two portions of information respectively, the software-defined network controller 500 can be configured to build two intra-Pod optical tunnels. One uses the route RT1 from the OADS 200a to the OADS 200b and selects to use wavelength $\lambda 1$. The other uses the route RT2 from the OADS 200a to the OADS 200c and selects to use wavelength $\lambda 2$. For building the optical tunnels, the wavelength selective switches on the route which should be set to select a specific wavelength to pass. Thus, the route RT1 only has to set the 2×1 first wavelength selective switch (as the first wavelength selective switch WSS11 shown in FIG. 2) in the first transmission module 210 of the OADS 200b at the destination and the optical tunnels can be built. The route RT2 has to set the 1×1 second wavelength selective switch (as the second wavelength selective switch WSS12 shown in FIG. 2) at West-East orientation in the first transmission module 210 of the OADS 200b and the 2×1 first wavelength selective switch (as the first wavelength selective switch WSS11 shown in FIG. 2) in the first transmission module 210 of the OADS 200c at the destination.

In the process of optical signal transmission, first, the optical signals with the wavelength $\lambda 1$ and the wavelength $\lambda 2$ are transmitted to, through the corresponding DWDM transceiver on the input-output port of the ToR switches of the corresponding racks, the corresponding add-port of the first transmission module 210a of the OADS 200a, combined to an optical fiber by the multiplexer 212, and are duplicated, split and transmitted to the West through the 2×2 first splitter SP11. At this time, the optical signals will be transmitted, the optical power being amplified by the optical signal amplifier EDFA1, through the first transmission ring Ring1 to the first transmission module 210b of the OADS 200b. After the optical signals are transmitted to the first transmission module 210b, the optical signal with wavelength $\lambda 1$ and the wavelength $\lambda 2$ will be duplicated and split into two optical signals by the second splitter SP12. One optical signal is transmitted downwardly. The other optical signal is transmitted to the West to the OADS 200c. Among them, the optical signal transmitted downwardly will pass through the 2×1 first wavelength selective switch WSS11 which selects the optical signal with wavelength $\lambda 1$ to pass and transmits to the demultiplexer 216, and finally be transmitted to, through the first drop-port of the demultiplexer 216, the receiver of the corresponding DWDM transceiver on the input-output port of the ToR switch of the corresponding rack. The optical transmission from rack to rack is completed.

On the other hand, the optical signal transmitted to the West will pass through the 1×1 second wavelength selective switch WSS12 which selects the optical signal with wavelength $\lambda 2$ to pass, and is duplicated, split and transmitted to the West through the 2×2 first splitter SP11. At this time, the optical signals will be transmitted, the optical power being amplified by the optical signal amplifier EDFA1, through the first transmission ring Ring1 to the first transmission module 210c of the OADS 200c. After the optical signals are transmitted to the first transmission module 210c, the optical signal with wavelength $\lambda 2$ will be duplicated and split into two optical signals by the 1×2 second splitter SP12. One optical signal is transmitted downwardly. The other optical signal is transmitted to the West. The optical signal transmitted downwardly will pass through the 2×1 first wavelength selective switch WSS11 which selects the optical signal with wavelength $\lambda 2$ to pass and transmits to the demultiplexer 216, and be transmitted to, through the second drop-port of the demultiplexer 216, the receiver of the corresponding DWDM transceiver on the input-output port of the ToR switch of the corresponding rack. The optical transmission from rack to rack is completed.

In addition, the software-defined network controller 500 can be configured to set a 1×1 second wavelength selective switch in the first transmission module 210c (refer to the second wavelength selective switch WSS12 in FIG. 2) to filter and block the optical signal with the wavelength $\lambda 2$ transmitted to the West in order to prevent the optical signal with the wavelength $\lambda 2$ from continuing to be transmitted to the next OADS 200d.

Through this, it is possible to build different optical tunnels on the same transmission ring Ring1 by using different wavelengths to transmit data to different optical nodes respectively. Thus, in the first tier network T1, the data transmission between the servers on different racks corresponding to each one of the OADSs 200a-200e in the same pod can be implemented.

Please refer to FIG. 1 again. As previously shown in FIG. 1, the first tier network T1 includes a plurality of pods P1-P4. The pods P1-P4 via being interconnected to the second tier network T2 can be formed a network structure with larger scale.

Structurally, any one of the OSISs (i.e., the OSIS 400a) of the second tier network T2 is connected to two adjacent pods in the first tier network T1 at the same time (i.e., Pod P1 and Pod P2). Thereby, data transmission between servers corresponding to different pods can be implemented through the OSISs 400a-400e in the second tier network T2.

Specifically, the first transmission modules 210 of the OADSs 200a-200e in the pod P1 are coupled to the OSIS 400a through a plurality of first longitudinal ports respectively. The second transmission modules 220 of the OADSs 200a-200e are coupled to, through a plurality of second longitudinal ports to the OSIS 400e respectively. In addition, the second transmission modules 220 in the pod P2 are coupled to the OSIS 400a through a plurality of second longitudinal ports respectively.

Alternately, any one of the OSISs 400a-400e in the second tier network T2 is connected to the first transmission module 210 and the second transmission module 220 corresponding to different transmission rings of the OADSs 200a-200e in two adjacent pods in the first tier network T1. The OADSs 200a-200e in the same pod in any one of the first tier networks T1 are coupled to the adjacent two of the OSISs 400a-400e in the second tier network T2 at the same time. through the dissimilar first transmission module 210 and the second transmission module 220.

As such, accompanied with the interconnect network between the OSISs 400a-400e, any OADSs 200a-200e can be built a plurality of end-to-end optical tunnels between each pod of the first tier network T1. Further through one or more OSIS 400a-400e, each pod of the first tier network T1 is connected to OADSs 200a-200e of the other pods for transmission.

Figure 4:
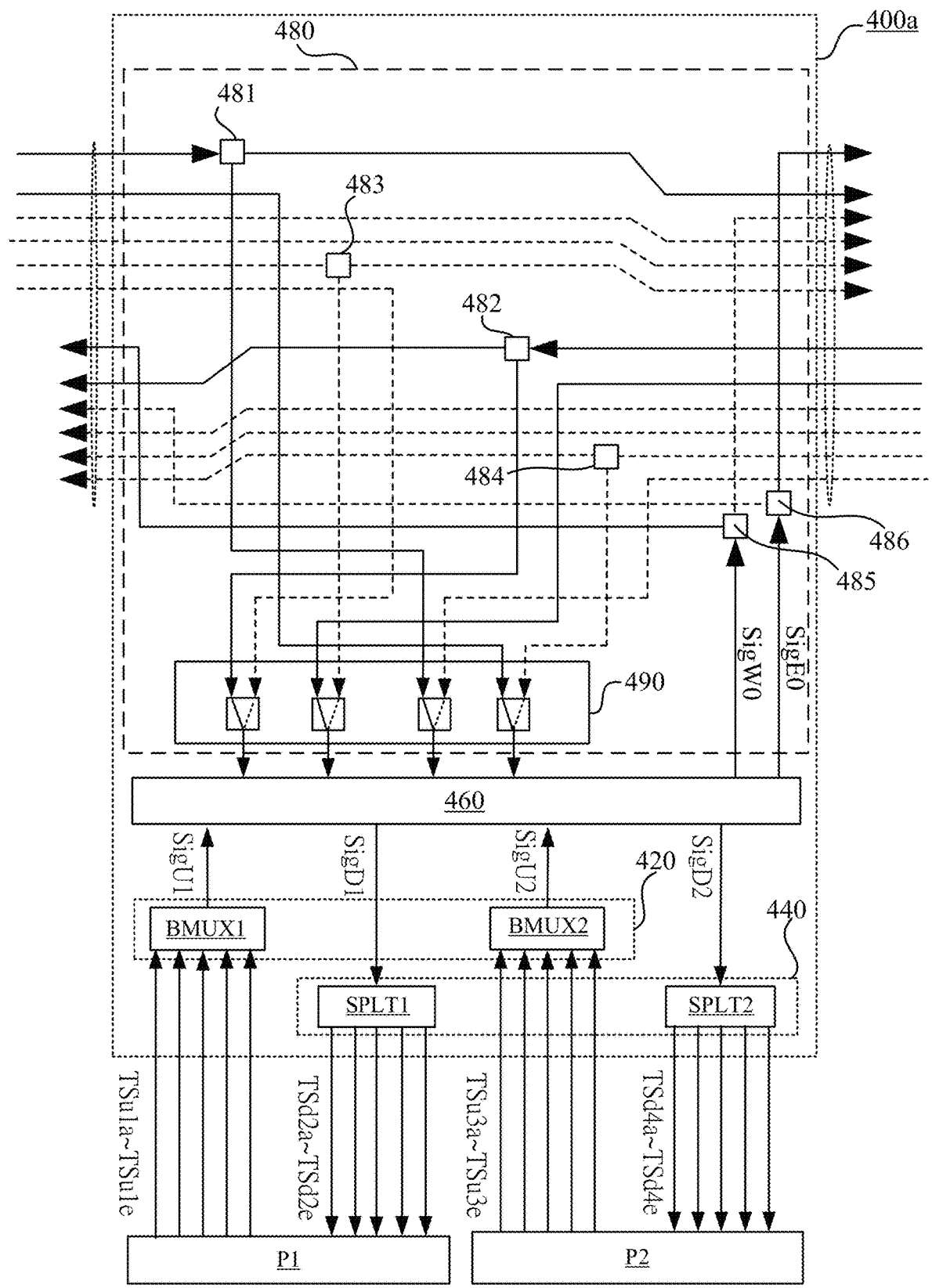
FIG. 4 is a schematic diagram illustrating an optical switch interconnect sub-system (OSIS) in accordance with some embodiments of the present disclosure.

For ease of description, the following paragraphs are the description with the relevant diagrams for the internal specific structure of the OSIS 400a and the relevant operation of an implement of optical signal transmission. Please refer to FIG. 4. FIG. 4 is a schematic diagram of an optical switch interconnect sub-system 400a in accordance with some embodiments of the present disclosure. It should be noticed that although FIG. 4 illustrates the structure and operation of the OSIS 400a as an example, the structures and operations of the remaining OSISs 400b-400e are similar, and therefore will not be described again.

The OSIS 400a is mainly used as a relay node for building optical tunnels between different pods. As shown in FIG. 4, the internal design of the OSIS 400a can be divided into a receiving sub-module 420, an output sub-module 440, an optical switching sub-module 460, and an interconnection fabric module 480. The interconnection fabric module 480 further includes a failover sub-module 490.

The OSIS 400a includes a plurality of add-ports and drop-ports. The amounts of them are equal and corresponsive to the amounts of the OADS 200 in each pod in the first tier network T1. For example, when each pod includes five OADSs 200a-200e respectively, the OSIS 400a should be connected to ten OADSs in adjacent pod P1 and P2. Thus, ten add-ports and ten drop-ports are needed.

As shown in the figure, the receiving sub-module 420, coupled to each add-port, is configured to receive a plurality of first uplink transmission optical signals TSu1a-TSu1e from a plurality of first OADSs 200a-200e corresponding to the first pod P1 of the OSIS 400a, and a plurality of third uplink transmission optical signals TSu3a-TSu3e from a plurality of second OADSs 200a-200e corresponding to the second pod P2.

The OSIS 400a respectively is connected to all the OADSs 200a-200e in the two adjacent pods P1 and P2 in the first tier network T1 with optical fibers. In order to combine and filter the optical signals uploaded from the OADSs 200a-200e, in some embodiments, the receiving sub-module 420, including two wavelength band multiplexers (band MUX) BMUX1 and BMUX2, is configured to receive, respectively, the first uplink transmission optical signals TSu1a-TSu1e, the third uplink transmission optical signals TSu3a-TSu3e with different wavelength bands transmitted by the OADSs 200a-200e in the pods P1 and P2, and combine them into the composite signal SigU1 and SigU2 to one optical fiber to enter into the optical switching sub-module 460.

In some embodiments, the two wavelength band multiplexers BMUX1 and BMUX2 are connected to different transmission rings of the OADSs of different pods P1 and P2. For example, as shown in FIG. 1 and FIG. 4, the wavelength band multiplexer BMUX1 is connected downwardly to the first transmission module 210 of each of the OADSs 200a-200e in the pod P1. The wavelength band multiplexer BMUX2 is connected downwardly to the second transmission module 220 of each of the OADSs 200a-200e in the pod P2. For ease of understanding, the connection between the first tier network T1 and the second tier network T2 will be described in detail in the following paragraphs.

Therefore, in the embodiment shown in FIG. 1, if a pod P1 includes at most five OADSs 200a-200e and the first transmission module 210 and the second transmission module 220 of corresponding OADSs 200a-200e on each transmission ring use different wavelength frequency bands, the wavelength band multiplexers BMUX1 and BMUX2 configured in the OSIS 400a are five-band multiplexer separately to allow the optical signals with five different wavelength frequency band to pass through five add-ports, respectively. For example, for the optical signals entering into the wavelength band multiplexers BMUX1 through the first add-port, only the optical signals with wavelength $\lambda 1$-$\lambda 8$ can pass, and the optical signals with remaining wavelength are filtered out by the wavelength band multiplexers BMUX1. For the optical signals entering into the wavelength band multiplexers BMUX1 through the second add-port, only the optical signals with wavelength $\lambda 9$-$\lambda 16$ can pass, and so on.

The output sub-module 440, coupled to each drop-port, is configured to transmit the composite optical signals SigD1 and SigD2 transmitted from the optical switching sub-module 460 to the pod P1 and P2 in the first tier network T1. Specifically, the output sub-module 440 mainly includes splitters SPLT1 and SPLT2. In structure, the splitter SPLT1 is connected to the OADSs 200a-200e in pod P1. The splitter SPLT2 is connected to the OADSs 200a-200e in pod P2. The splitter SPLT1 and SPLT2 are configured to duplicate and split the composite optical signal SigD1 and SigD2 transmitted downwardly by the optical switching sub-module 460 as the second downlink transmission optical signals TSd2a-TSD2e and the fourth downlink transmission optical signals TSd4a-TSD4e to each OADSs 200a-200e of the pod P1 and P2 in the first tier network T1.

Therefore, in the embodiment shown in FIG. 1, if a pod P1 includes at most five OADSs 200a-200e, the 1×5 splitter SPLT1 duplicates the composted optical signal SigD1 into five the second downlink transmission optical signal TSd2a-TSd2e and outputs, to the first transmission module 210 of the five OADSs 200a-200e in the pod P1, respectively. The other 1×5 splitter SPLT2 duplicates the composted optical signal SigD2 into five the fourth downlink transmission optical signal TSd4a-TSd4e and outputs, to the second transmission module 220 of the five OADSs 200a-200e in the pod P2, respectively.

In structure, the optical switching sub-module 460, coupled to the receiving sub-module 420, the output sub-module 440 and the interconnection fabric module 480, is configured to receive the optical signals transmitted between the sub-module 420, the output sub-module 440 and the interconnection fabric modules 480.

In some embodiments, the optical switching sub-module 460 includes an N×M wavelength selective switch for wavelength selection, so that the OSIS 400a can transmit the optical signals which are transmitted from the first tier network T1 to the East and the West to other OSISs (such as OSISs 400b-400e) or downwardly to other pods in the first tier network T1, and can also receive optical signals from other OSISs 400b-400e in East and West direction and transmit them to the pod P1 and P2 in the first tier network T1. N and M are any positive integers greater than or equal to two and depend on the amount of transmission modules included in one OADS 200 and the amount of the OSISs 400a-400e included in the second tier network T2, in which the OSISs 400a-400e are connected to each other.

Taking the embodiment shown in FIG. 1 as an example, since one OADS 200 includes two independent first transmission modules 210 and second transmission modules 220, the OSIS 400a is configured with two pods of multiplexer BMUX1, BMUX2. Correspondingly, the optical switching sub-module 460 includes a first uplink input terminal and a second uplink input terminal, which are, respectively coupled to the multiplexer BMUX1 and the multiplexer BMUX2, configured to receive a composite optical signal SigU1 and a composite optical signal SigU2, respectively.

In addition, since there are five OSISs 400a-400e connected in the second tier network T2, each OSIS (such as the OSIS 400a) has four lines connected from the other four OSIS 400b-400e. Therefore, the optical switching sub-module 460 includes a plurality of corresponding downlink input terminals coupled to the interconnection fabric module 480 and configured to receive the lateral transmission optical signals transmitted by the remaining OSISs 400b-400e. Thus, in this embodiment, the amount of input terminals of the optical switching sub-module 460 is two uplink input terminals plus four downlink input terminals, and the value of N is six.

On the other hand, since the OSIS 400a is configured to transmit data downwardly to two pods P1, P2, the OSISs 400a is configured with two splitters SPLT1, SPLT2. Correspondingly, the optical switching sub-module 460 includes a first downlink output terminal and a second downlink output terminal, which are respectively coupled to the splitter SPLT1 and the splitter SPLT2. The splitter SPLT1 is configured to output the second downlink transmitted optical signal TSd2a-TSd2e. The splitter SPLT2 is configured to output the fourth downlink transmission optical signals TSd4a-TSd4e.

In addition, the OSIS 400a is further configured to output signals in East and West direction to the remaining OSIS 400b-400e. Therefore, the optical switching sub-module 460 includes a first uplink output terminal and a second uplink output terminal, which are, respectively coupled to the interconnection fabric module 480, configured to output the lateral transmission optical signal to the remaining OSISs 400b-400e. As a result, in this embodiment, a total of four outputs are required, and the value of M is 4.

In this structure, the 6×4 (6 in and 4 out) optical switching sub-module 460 simplifies the fabric design compared to the existing optical switching sub-module. Not only is the usage of line less, but also the optical switching sub-module 460 can be configured to be used with the failover sub-module for detecting the intensity of optical signals (please refer to FIG. 6).

Figure 5:
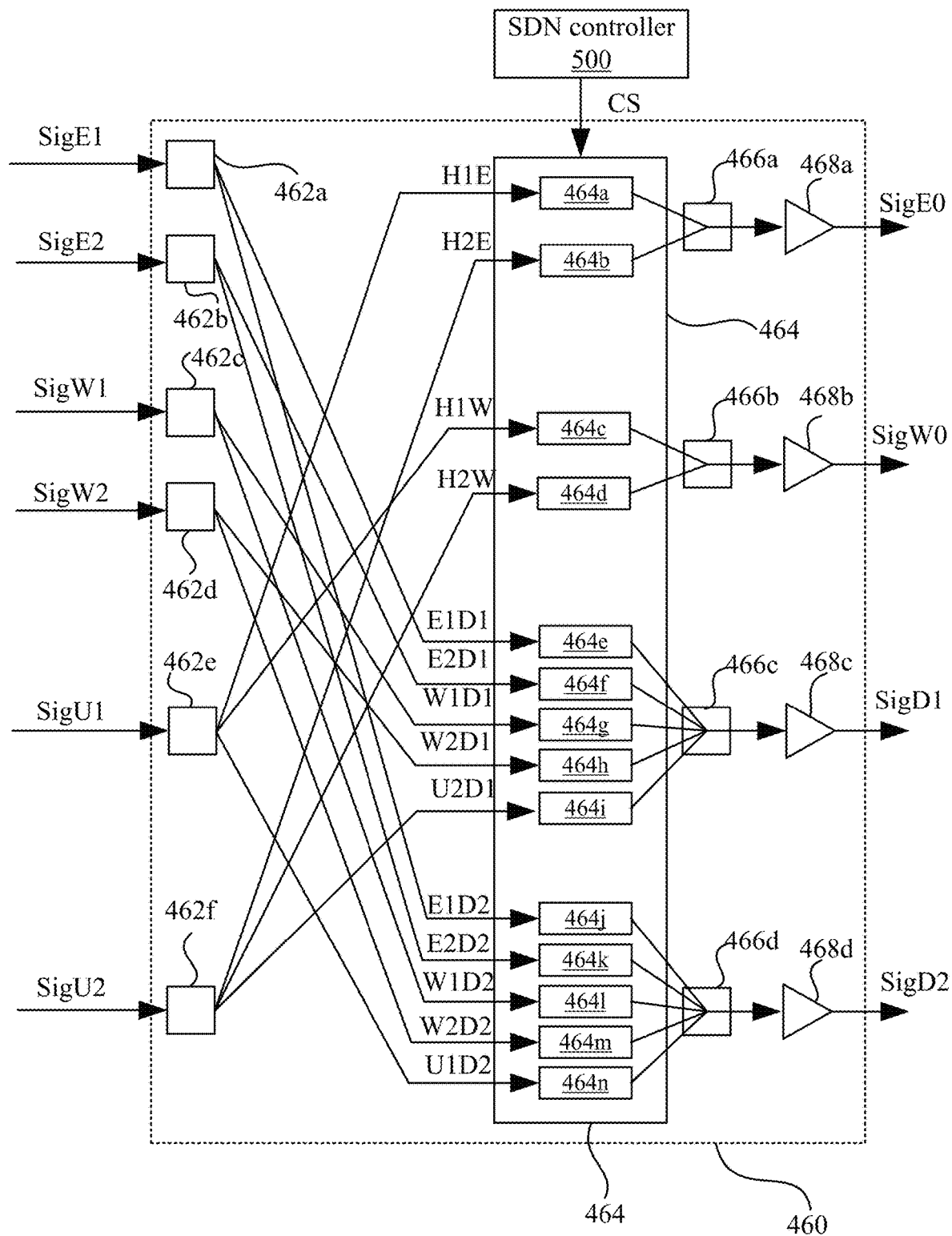
FIG. 5 is a schematic diagram of internal design of an optical switching sub-module in accordance with some embodiments of the present disclosure.

Please refer to FIG. 5. FIG. 5 is a schematic diagram of the internal design of the optical switching sub-module 460 in accordance with some embodiments of the present disclosure. As shown in FIG. 5, the 6×4 optical switching sub-module 460 includes a plurality of input splitters 462a-462f, a wavelength selective switch array 464, a plurality of output combiners 466a-466d, and a plurality of optical signal amplifiers 468a-468d. Precisely, in the optical switching sub-module 460, the amount of input splitters 462a-462f corresponds to the N pieces of input terminals, the number of output combiners 466a-466d and the optical signal amplifiers 468a-468d correspond to the number of output terminals M. In this embodiment, the 6×4 optical switching sub-module 460 includes six input splitters 462a-462f, four output combiner 466a-466d, and four optical signal amplifiers 468a-468d. The wavelength selective switch array 464 is an array combined with fourteen 1×1 wavelength selective switches 464a-464n. In this embodiment, the six input splitters 462a-462f include four downlink transmission input splitters 462a-462d and two uplink transmission input splitters 462e-462f. The fourteen wavelength selective switches 464a-464n include four laterally transmission wavelength selective switches 464a-464d, the downlink transmission wavelength selective switches 464e-464i in the first part, and the downlink transmission wavelength selective switches 464j-464n in the second part. Four output optical combiners 466a-466d include two lateral transmission output combiners 466a-466b and two downlink transmission output combiner 466c-466d.

In operation, the input splitters 462a-462f, coupled to the downlink input terminal, the first uplink input terminal, or the second uplink input terminal respectively, are configured to duplicate and correspondingly output a plurality of first optical signals to a plurality of wavelength selective switches 464a-464n in the wavelength selective switch array 464. The wavelength selective switches 464a-464n are respectively configured to receive and select, according to a control signal CS outputted by the software-defined network controller 500, the corresponding wavelength of the first optical signal as the second optical signal to the corresponding output combiners 466a-466d. The output combiners 466a-466d are respectively configured to receive and combine two or more of the second optical signals to output a plurality of third optical signals to the optical signal amplifiers 468a-468d. Thereby, the optical signal amplifiers 468a-468d can amplify the third optical signal and output the amplified third optical signal as composite optical signal SigD1, SigD2, SigE0 and SigW0 through the first downlink output terminal, the second downlink output terminal, the first uplink output terminal or the second uplink output terminal respectively. The following paragraphs describe the operation of each device unit separately.

Specifically, the uplink transmission input splitter 462e is coupled to the first uplink input terminal, and the uplink transmission input splitter 462f, coupled to the second uplink input terminal, is configured to receive the composite signal SigU1 and SigU2 from the multiplexer BMUX1 and the multiplexer BMUX2. The uplink transmission input splitter 462e and the uplink transmission input splitter 462f are configured to duplicate and split the composite signal SigU1 and SigU2 into three beams and be connected to the three different 1×1 wavelength selective switches 464a-464n in the wavelength selective switch array 464, respectively. As shown in the figure, the uplink transmission input splitter 462e is coupled to the wavelength selective switches 464a, 464c, 464n, and correspondingly outputs a first lateral transmission signal H1E, a second lateral transmission signal H1W and the third downlink transmission signal U1D2. The uplink transmission input splitter 462f is coupled to the wavelength selective switches 464b, 464d, 464i, and correspondingly outputs a first lateral transmission signal H2E, a second lateral transmission signal H2W and the third downlink transmission signal U2D1.

The downlink input terminals are configured to receive optical signals from each two OSIS at the East and the West respectively. For example, for the optical switching sub-module 460 in the OSIS 400a, the downlink input terminals are configured to receive the lateral optical signals SigE1 and SigE2 transmitted from the optical switching sub-module 460b and 460c at the East and the lateral optical signals SigW1 and SigW2 transmitted from the optical switching sub-module 460e and 460d at the West. The optical signal SigE1, SigE2, SigW1, and SigW2 are respectively transmitted to the 1×2 downlink transmission input splitters 462a, 462b, 462c, 462d through the downlink input terminal with the optical fiber connection in order to be duplicated and split into two beams and connected to the corresponding one of the 1×1 wavelength selective switches 464a-464n.

Specifically, any one of the downlink transmission input splitters 462a-462d coupled to the corresponding one of the downlink input terminal, is configured to duplicate the lateral optical signal SigE1, SigE2, SigW1, and SigW2 received from the corresponding OSIS 400b-400e and outputted the corresponding first downlink transmission signal E1D1, E2D1, W1D1, W2D1 and the second downlink transmission signal E1D2, E2D2, W1D2 and W2D2 to the corresponding one of the wavelength selective switches 464a-464n in the wavelength selective switch array 464.

As shown in the figure, in an embodiment, the downlink transmission input splitter 462a is connected to and outputs the first downlink transmission signal E1D1 and the second downlink transmission signal E1D2 to the corresponding wavelength selective switches 464e, 464j. The downlink transmission input splitter 462b is connected and outputs the first downlink transmission signal E2D1 and the second downlink transmission signal E2D2 to the corresponding wavelength selective switches 464f, 464k. The downlink transmission input splitter 462c is connected and outputs the first downlink transmission signal W1 D1 and the second downlink transmission signal W1D2 to the corresponding wavelength selective switches 464g, 464l. The downlink transmission input splitter 462d is connected and outputs a first downlink transmission signal W2D1 and a second downlink signal W2D2 to the corresponding wavelength selective switches 464h, 464m.

In the fourteen wavelength selective switches 464a-464n in the wavelength selective switch array 464, among them, four lateral transmission wavelength selective switches 464a, 464b, 464c, 464d are configured to, respectively, perform wavelength selection to the lateral transmission signal H1E, H2E, H1W, and H2W transmitted to the other optical switching sub-module 460 in East and West direction in the second tier network T2 in order to select the corresponding wavelength to be output as the third optical signal. The downlink transmission wavelength selective switches 464e-464i in the first part and the downlink transmission wavelength selective switches 464j-464n in the second part are configured to perform wavelength selection to the downlink transmission signals transmitted downwardly in the adjacent pods in the first tier network T1.

Specifically, the downlink transmission wavelength selective switches 464e-464i in the first part are configured to, respectively, select the downlink transmission signal E1D1, E2D1, W1D1, W2D1 and the corresponding wavelength of the downlink transmission signal U2D1 and output as the corresponding third optical signal. The downlink transmission wavelength selective switches 464j-464n in the second part are configured to, respectively, select the downlink transmission signal E1D2, E2D2, W1D2, W2D2 and the corresponding wavelength of the downlink transmission signal U1D2 and output as the corresponding third optical signal. Thus, the downlink transmission wavelength selective switches 464e-464i in the first part can perform wavelength selection to the optical signal transmitted to the pod P1 downwardly. The downlink transmission wavelength selective switches 464j-464n in the second part can perform wavelength selection to the optical signal transmitted to the pod P2 downwardly.

In summary, after the operation of the wavelength selection is completed by the fourteen wavelength selection switches 464a-464n in the wavelength selective switch array 464, the third optical signals outputted by the wavelength selective switch array 464 have four transmission direction, to East, to West, to the pod P1 and the pod P2 respectively. Each wavelength selective switch 464a-464n with same transmission direction are connected to the corresponding one of the output combiner 466a-466d to combine the optical signals into one optical path.

As shown in the embodiment in FIG. 5, the lateral transmission output combiner 466a is configured to combine the third optical signals output from the lateral transmission wavelength selective switch 464a and 464b. The other lateral transmission output combiner 466b is configured to combine the third optical signals output from the lateral transmission wavelength selective switch 464c and 464d. The downlink transmission output combiner 466c is configured to combine the third optical signals output from the downlink transmission wavelength selective switches 464e-464i in the first part. The downlink transmission output combiner 466d is configured to combine the third optical signals output from the downlink transmission wavelength selective switches 464j-464n in the second part.

Finally, the output combiner 466a-466d are respectively connected to the corresponding one of optical signal amplifiers 468a-468d in order to enhance optical signal intensity to ensure that the composite optical signal SigD1, SigD2, SigE0 and SigW0 have sufficient power to be transmitted to the destination.

It should be noticed that similar to the optical communication in the first tier network T1, when the optical signals with the same wavelength enter into the optical switching sub-module 460 at the same time, the conflict may be caused by the optical signals with the same wavelength passing through the same output combiner 466a-466d.

For example, when the optical signals SigU1 and SigU2 from the pod P1 and the pod P2 are both transmitted to the East if wavelengths of both signals are λ5, the two optical signals with wavelength λ5 are combined into one optical fiber through the output combiner 466a and conflict occurs. Similarly, if the optical signal SigU1 and SigU2 are both transmitted to the West, the conflict occurs by the output combiner 466b. Furthermore, when the wavelengths of the two optical signal sigE1 and SigW1 from the first OSIS 400b and 400e at the East and the West are both wavelength λ6, the composite optical signal passing to the pod P1 through the 5×1 output combiner 466c will cause conflict. Similarly, if the optical signal is transmitted to the pod P2, the conflict occurs by the 5×1 (5 input and 1 output) output combiner 466d.

Figure 6:
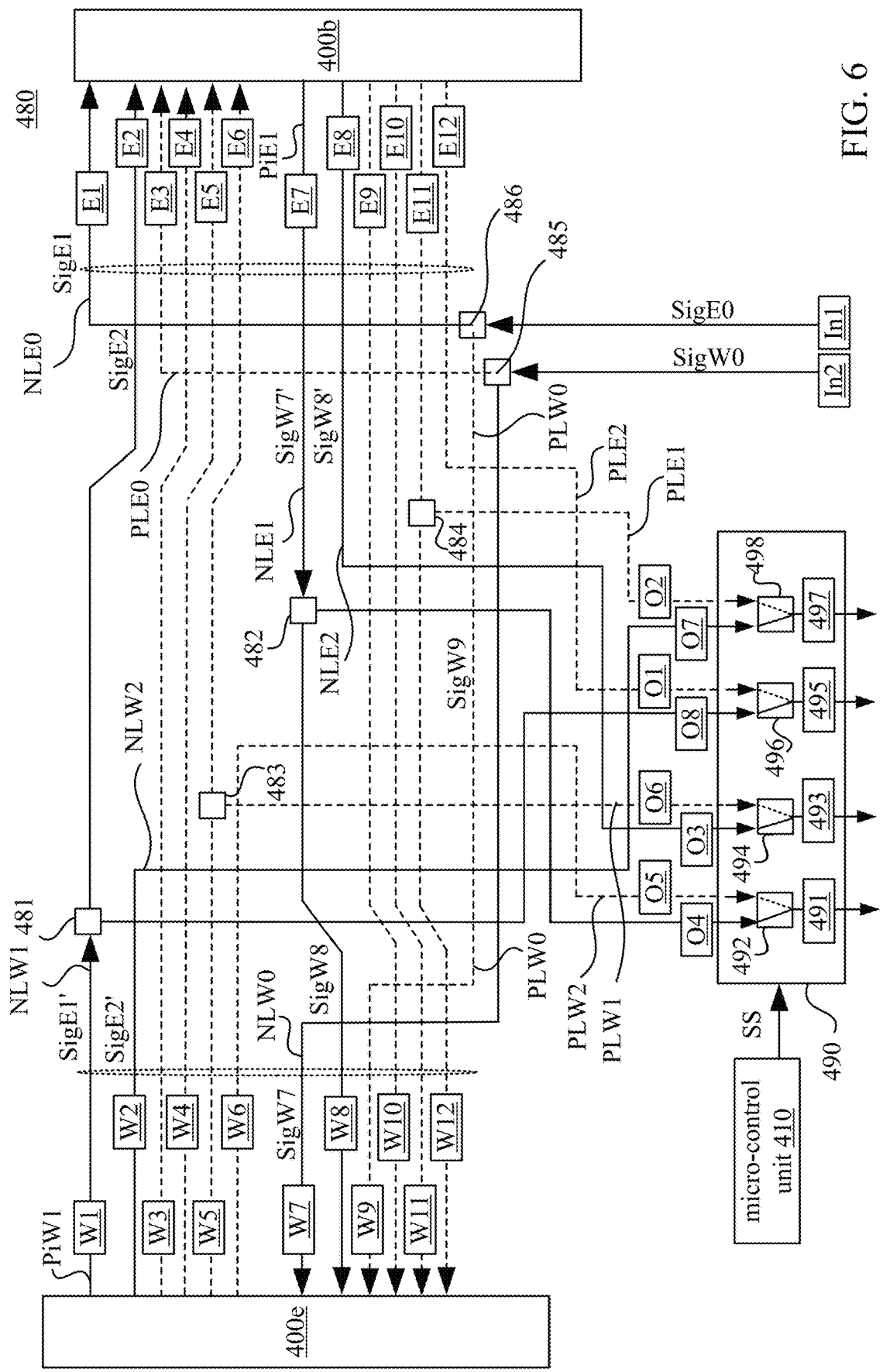
FIG. 6 is a schematic diagram of an interconnection fabric module and a failover sub-module in accordance with some embodiments of the present disclosure.

Please refer to FIG. 6. FIG. 6 is a schematic diagram of the interconnection fabric module 480 in accordance with some embodiments of the present disclosure. The interconnection fabric module 480 is configured to connect the OSISs 400a-400e. Any two of the OSISs 400a-400e transmit the corresponding lateral transmission optical signal between each other through the corresponding first line (i.e., the normal fabric). In some embodiments, any two of the OSISs 400a-400e are connected to each other with the second line (i.e., the protection fabric) which is different from the first line. The interconnection fabric module 480 includes the failover sub-module 490.

Specifically, The interconnection fabric module 480 includes upload terminal In1, In2, East output terminal E1, E2, East protection output terminal E3-E6, East input terminal E7-E8, East protection input terminal E9-E12, West input terminal W1, W2, West protection input terminal W3-W6, West output terminal W7, W8, West protection output terminal W9-W12, interconnect splitters 481-486 and the failover sub-module 490.

The interconnection fabric module 480 includes the internal fabrics for the OSIS 400a to connect to the other OSISs 400b-400e in East and West direction. As shown in the figure, the interconnect fabrics include the normal fabric and the protection fabric. The normal fabric (as shown with the solid line) is configured to transmit the optical signals under the normal condition of the system. The protection fabric (as shown with the dash line) is configured to transmit the optical signals in reverse direction under the condition of the normal fabric being cut off. The amount of interconnect circuits depends on the total amount of OSISs 400a-400e to which the system is connected. For example, the present embodiment is a fabric diagram of the interconnect situation of five OSISs 400a-400e. In fact, the interconnect structure between the OSISs 400a-400e in the second tier network T2 is essentially a mesh structure. Thus, there will be one output line NLE0 to the East, one output line NLW0 to the West, two input line NLE1, NLE2 from the OSIS (i.e., OSIS 400b and OSIS 400c) from the East, two input line NLW1, NLW2 from the OSIS (i.e., OSIS 400e and OSIS 400d) from the West. There are a total of two normal solid lines connected to the OSIS 460 and a total of four normal solid lines connected to the failover sub-module 490.

On the other hand, there will be at least six protection output line PLW0, PLE0 and protection input line PLE1, PLE2, PLW1, PLW2 (dash line) because of one-to-one correspondence with the normal lines. The remaining lines are transition lines. Some lines utilize interconnect splitters 481-486 to duplicate and split the optical signals and transmits to the OSIS and next OSIS at the same time. The other transit this OSIS directly and are connected to the next OSIS in East-West direction.

The input lines NLE1, NLE2, NLW1, NLW2 and the protection input lines PLE1, PLE2, PLW1, and PLW2 are coupled to the failover sub-module 490. As the embodiment shown in FIG. 6, the input lines NLE1, NLE2, NLW1, NLW2 and the protection input lines PLE1, PLE2, PLW1, and PLW2 are directly connected to the failover sub-module 490. However, the present disclosure is not limited therein. In other embodiments, the input lines NLE1, NLE2, NLW1, NLW2 and the protection input lines PLE1, PLE2, PLW1, and PLW2 can be connected to the failover sub-module 490 indirectly. On the other hand, the output lines NLE0 and NLW0 are connected to the optical switching sub-module 460.

For the signals to be output from the pod P1 or the pod P2 to the other OSISs 400b-400e, firstly, from the optical switching sub-module 460, two optical fibers from the OSIS to the East and the West will be connected to the first upload terminal In1 and the second upload terminal In2 of the interconnection fabric module 480 respectively.

The first upload terminal In1 and the second upload terminal In2 are connected to a 1×2 interconnect splitter 485 and 486. The interconnect splitter 485 is configured to duplicate and output the composite optical signal SigW0 received from the optical switching sub-module 460 as a lateral transmission optical signal SigW7 through the first West output terminal W7 (i.e., line NLW0) and as another lateral transmission optical signal through the first East protection terminal E3 (i.e., line PLE0). Similarly, The interconnect splitter 486 is configured to duplicate and output the composite optical signal SigE0 received from the optical switching sub-module 460, through the first East output terminal E1 (i.e., line NLE0) as a lateral transmission optical signal SigE1 and through the first West protection output terminal W9 (i.e., line PLW0) as a lateral transmission optical signal SigW9.

In other words, the interconnect splitters 485 and 486 are configured to duplicate and split the optical signal into two beams, respectively, one being transmitted in the normal direction (which are the normal fabric NLW0 and NLE0) to the OSISs 400e, 400d, 400b and 400c, the other being transmitted in reverse direction (which are the protection input lines PLE0 and PLW0).

As shown in the figure, the interconnection fabric module 480 transmits the corresponding lateral transmission optical signal SigE1 to the OSISs 400b and 400c in a first direction (i.e., eastward) and the corresponding lateral transmission optical signal SigW7 to the OSISs 400e and 400d in a second direction (i.e., westward) which is different with the first direction. In other words, in the normal path, the interconnection fabric module 480 transmits the optical signals to the remaining OSIS 400b-400e in two different directions.

Similarly, for the signals received from the other OSISs 400b-400e and output to the pod P1 or the pod P2, there are the normal fabric and the protection fabric separately. In the aspect of the normal fabric, the normal fabrics NLE1 and NLW1, connected through two input ports, a first East input PiE1 and a first West input PiW1, are configured to receive signals from the first OSIS 400b at the East and the first OSIS 400e at the West.

The first east input terminal E7 and the first west input terminal W1 receive, respectively, the lateral transmission optical signals SigW7' and SigE1' from the first west output terminal W7 and first East output terminal E1 of the interconnection fabric module 480 of the adjacent OSISs 400b and 400e. On the normal fabric, the normal fabrics NLE1 and NLW1 are connected to a interconnect splitters 482 and 481 respectively to duplicate and split the lateral transmission optical signals SigW7' and SigE1' into two beams, one being transmitted continually westward and eastward, the other being transmitted to the local failover sub-module 490.

As shown in the figure, the two lines eastward and westward are finally connected to the position of the output port shifted downwardly. In other words, the interconnect splitter 481 is configured to duplicate a lateral transmission optical signal SigE1' received from the first west input terminal W1 and output it as a lateral transmission optical signal SigE2 through the second east output terminal E2. The interconnect splitter 482 is configured to duplicate a lateral transmission optical signal SigW7' received from the second west input terminal W8 and output it as a lateral transmission optical signal SigW8 through the second west output terminal W8. In addition, the two lines transmitting to the local failover sub-module 490 are connected to output ports O4 and O8 respectively.

The second pod of normal fabrics NLE2, NLW2, connected from, the second east input terminal E8 and a second west input terminal W2 respectively, are configured to receive the lateral transmission optical signals SigW8' and SigE2' transmitted from the second OSIS 400*c* at the east and the second OSIS 400*d* at the west, connected to the output ports O3, O7 respectively and are connected directly to the local failover sub-module 490.

In the aspect of protection fabric, the basic design principle is to configure the fabric corresponding to the normal lines but in reverse transmission direction in order to be connected to the node of the OSIS at the same destination of the normal (solid line) path.

Different with the normal fabric, under the condition of five OSISs 400*a*-400*e* interconnected with each other, the protection path needs to pass two nodes of the OSISs in reverse direction and then reaches the node of the OSIS at the same destination of the normal path.

For example, assuming that the line of the present OSIS at the east is cut off, the optical signals of two OSISs at the east must be transmitted westward through the protection path (the two OSIS at the west is not affected, using the original normal path). The optical signal must bypass two OSIS and then reach the two OSIS at the east. It is not necessary for the system to receive the optical signal when they bypass the two OSIS at the west.

Thus, there is no splitter configured in every two optical fibers on the protection path eastward and westward in the OSIS 400*a*. As shown in the figure, the first east protection input terminal E9 and the first west protection input terminal W3 are configured to, respectively, receive the lateral transmission optical signals from the first west protection output terminal W9 and the first east protection output terminal E3 in the interconnection fabric module 480 of the adjacent OSISs 400*b* and 400*e* and output the lateral transmission optical signals through the second west protection output terminal W10 and the second east protection output terminal E4.

Similarly, the second east protection input terminal E10 and the second west protection input terminal W4 are configured to, respectively, receive the lateral transmission optical signals from the second west protection output terminal W10 and the second east protection output terminal E4 in the interconnection fabric module 480 of the adjacent OSISs 400*b* and 400*e* and output the lateral transmission optical signals through the third west protection output terminal W11 and the third east protection output terminal E5.

The third east protection input terminal E11 and the third west protection input terminal W5 are configured to, respectively, receive the lateral transmission optical signals from the third west protection output terminal W11 and the third east protection output terminal E5 in the interconnection fabric module 480 of the adjacent OSISs 400*b* and 400*e*.

The interconnect splitters 484 and 483, coupled to the third east protection input terminal E11 and the third west protection input terminal W5, are configured to duplicate the received lateral transmission optical signals, be connect to the position of the output port shifted downwardly, transmit optical signals through the fourth west protection output terminal W12 and the fourth east protection output terminal E6 and output the lateral transmission optical signals through the output terminals O2 and O6 to the failover sub-module 490.

Finally, the fourth east protection input terminal E12 and the fourth west protection input terminal W6 are configured to, respectively, receive the lateral transmission optical signals from the fourth west protection output terminal W12 and the fourth east protection output terminal E6 in the interconnection fabric module 480 of the adjacent OSISs 400*b* and 400*e* and output the lateral transmission optical signals through the output terminals O1 and O5 to the failover sub-module 490.

As shown in the figure, the failover sub-module 490 is coupled to the interconnect splitters 483, 484, the fourth east protection input terminal E12 and the fourth west protection input terminal W6. Furthermore, the failover sub-module 490 is coupled to the interconnect splitters 481, 482 on the normal path, the second east protection input terminal E8 and the second west protection input terminal W2. In this way, the failover sub-module 490 can be configured to receive selectively the lateral transmission optical signal transmitted from the normal path or the protection path. The failover sub-module 490 can output the lateral transmission optical signal to the optical switching sub-module 460 from the normal path through interconnect splitters 481 and 482, the second east input terminal E8 and the second west input terminal W2 or selectively output the lateral transmission optical signal to the optical switching sub-module 460 from the protection path through interconnect splitters 483 and 484, the fourth east protection input terminal E12 and the fourth west protection input terminal W6.

As shown in the figure, the failover sub-module 490 includes a plurality of optical switches 492, 494, 496, and 498. The optical switches 492, 494, 496, and 498 receive, through the first line (which is the normal fabric) and the second line (which is the protection fabric), the first lateral transmission optical signal (transmitted via the normal fabric) and the second lateral transmission optical signal (transmitted via the protection fabric) from the corresponding one of the remaining OSISs 400*b*-400*e*. The first lateral transmission optical signal and the second lateral transmission optical signal here refer to the lateral transmission optical signal transmitted between different OSISs 400*a*-400*e* in the ring-shaped mesh structure R2. One of the first lateral transmission optical signal and the second lateral transmission optical signal is outputted to the optical switching sub-module 460, corresponding to a select signal SS output from the micro-control unit 410 (MCU). Transmitting lateral optical signals in the ring-shaped mesh structure R2 will be further described in the following embodiment.

Figure 7A:
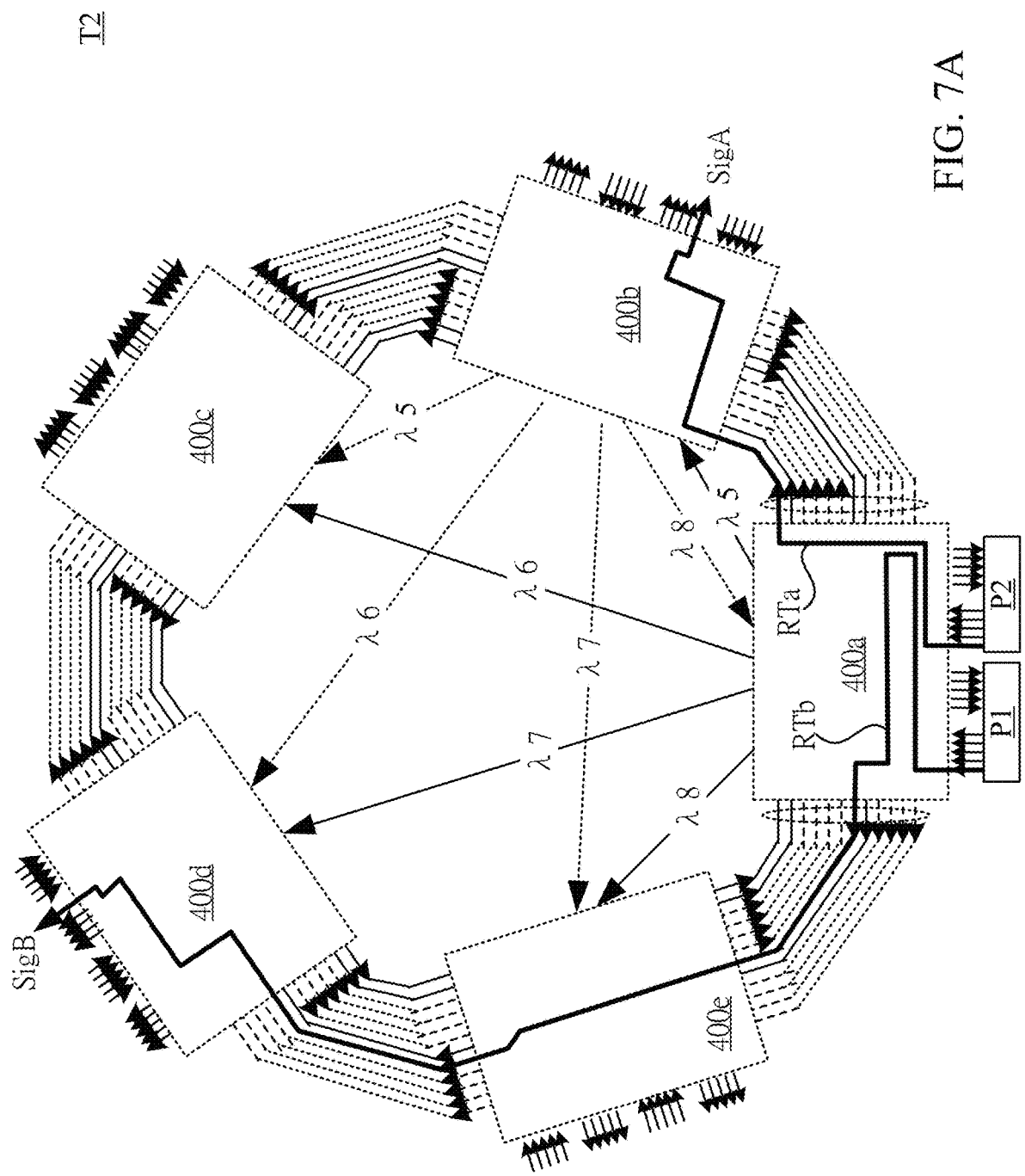
FIG. 7A is a schematic diagram of an interconnection network between optical switch interconnect sub-systems in a second tier network in accordance with some embodiments of the present disclosure.
Figure 7B:
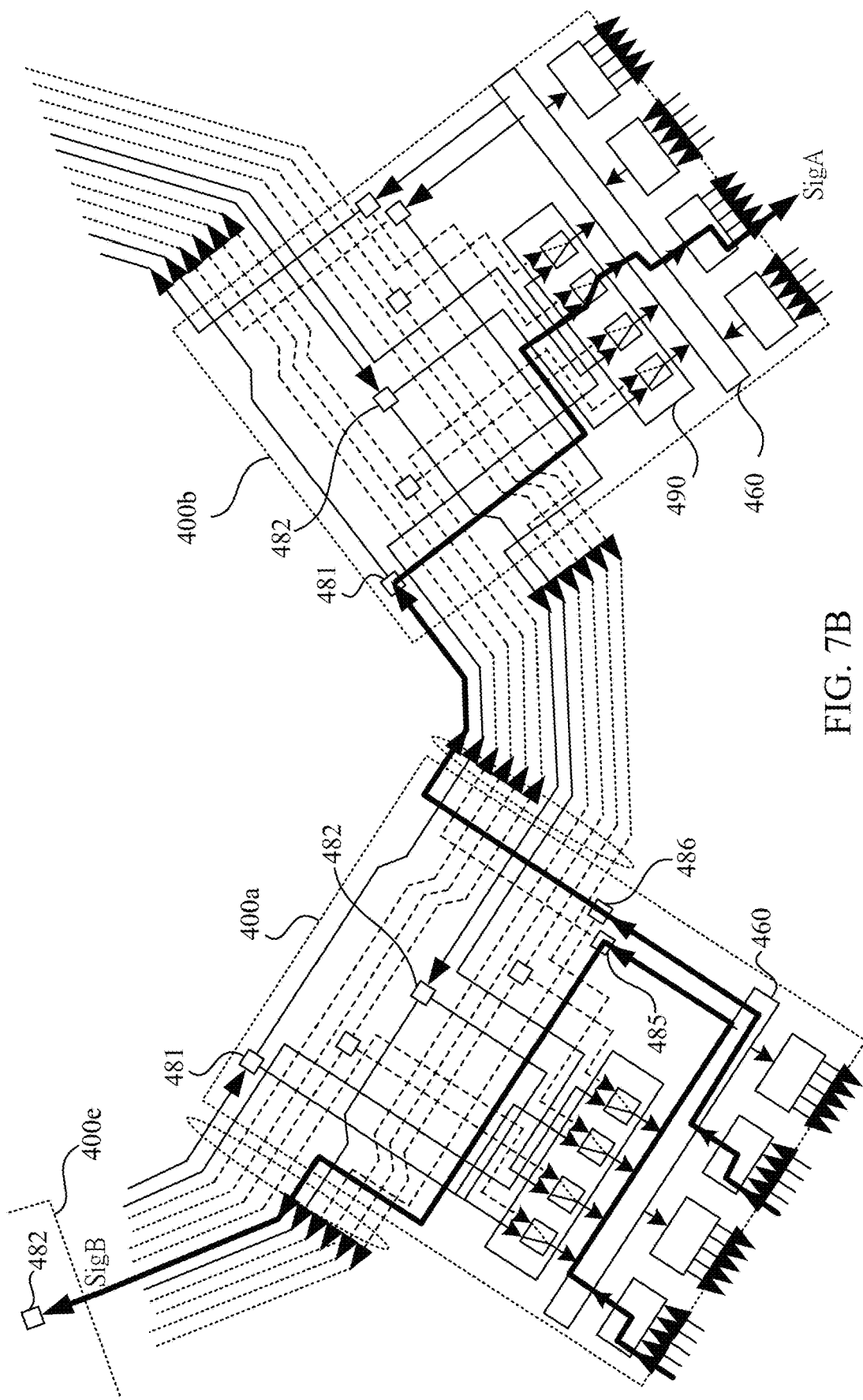
FIG. 7B is a partially enlarged schematic view of FIG. 7A.

Please refer to FIG. 7A and FIG. 7B. FIG. 7A is a schematic diagram of an interconnection network between the OSISs 400*a*-400*e* in a second tier network T2 in accordance with some embodiments of the present disclosure. FIG. 7B is a partially enlarged schematic view of FIG. 7A.

The interconnection network is mainly configured to build the optical tunnel for transmission between the OSIS 400*a*-400*e*, such that each pod in the first tier network T1 to which each OSISs 400*a*-400*e* is connected can transmit optical signals to each other. As mentioned above, the interconnection network between the OSISs 400*a*-400*e* is essentially in a mesh structure. Through some optical fibers in the Ribbon fiber, the connections from every OSISs 400*a*-400*e* to other OSIS are independent of each other. For example, the connection between the OSIS 400*a* and the other OSIS 400*b*-400*e* and the connection between the OSIS 400*b* and the other OSIS 400*a*, 400*c*-400*e* are independent of each other.

Since the ribbon fiber is adopted, all the OSISs 400*a*-400*e* are connected in a ring structure in appearance, which simplifies the wiring complexity. In addition, because of this mesh network architecture, data transmission between pairs of different OSISs 400a-400e can be simultaneously transmitted using the same wavelength combination without conflict, highlighting the characteristics of wavelength reusability.

Please refer to FIG. 4 and FIG. 6 for a better understanding of the interconnect network between OSISs 400a-400e illustrated in FIG. 7A and FIG. 7B.

As shown in FIG. 7A, under normal circumstances, the 400a will transmit and receive optical signals from the normal path to/from the OSISs 400b, 400c at the two nodes in the east and to/from the OSISs 400d, 400e at the two nodes in the west. Accompanied by the design of the internal interconnection fabric module 480 shown in FIG. 6, when the OSISs 400a-400e are interconnected via optical fibers, the optical paths of the east output terminals E1-E6 and the east input terminals E7-E12 the interconnection fabric of OSIS 400a are connected via optical fibers and correspond to the optical paths of the west input terminals W1-W6 and the west output terminals W7-W12 in the interconnection fabric of the next OSIS 400b, and so on.

Furthermore, since the factor of the interconnect structure between the OSISs 400a-400e, they can utilize the same wavelength combination (λ5, λ6, λ7, λ8) to transmit optical signals to each other without conflict, having the characteristics of wavelength reusability. As shown in the figure, the OSIS 400a can transmit optical signals to the OSISs 400b-400e, respectively, in wavelength combinations λ5, λ6, λ7, and λ8. The OSIS 400b can also transmit optical signals to the OSISs 400c-400e, 400a, respectively, in wavelength combinations λ5, λ6, λ7, λ8 without causing conflicts. Similarly, the same wavelength combination λ5, λ6, λ7 and λ8 may be reused for transmitting optical signals to other OSISs in other OSISs 400c to 400e, and the contents thereof are not described herein.

In the example shown in FIG. 7A, the path RTa represents that the optical signal SigA with the wavelength λ5 of the pod P2 in the first tier network T1 is transmitted from the OSIS 400a through the normal path to a first node (the OSIS 400b) at the east side. During the transmission, the 6×4 wavelength selective switch (i.e., optical switching sub-module 460) of the OSIS 400a selects the optical signal SigA from the pod P2 to be transmitted eastward, duplicated via the 1×2 internal interconnect splitter 486, split and transmitted to the next node (the OSIS 400b) in the normal direction (i.e., east). When the optical signal SigA enters into the internal interconnect circuit of the destination OSIS 400b, the optical signal SigA is duplicated, split and transmitted to the failover sub-module 490 of the OSIS 400b via the 1×2 interconnect splitter 481. At this time the failover sub-module 490 passes the optical signals which are on the normal path and transmits them to the 6×4 wavelength selective switch (i.e., the optical switching sub-module 460) of the OSIS 400b for wavelength selection and reception. The specific details of transmission of the optical signals are shown in FIG. 7B and will not be described here.

One the other hand, the path RTb represents that the optical signal SigB with the wavelength λ7 of the pod P1 in the first tier network T1 is transmitted from the OSIS 400a through the normal path to a second node (the OSIS 400d) at the west side. During the transmission, the 6×4 wavelength selective switch (i.e., optical switching sub-module 460) of the OSIS 400a selects the optical signal SigB from the pod P1 to be transmitted westward, duplicated via the 1×2 internal interconnect splitter 485, split and transmitted to the next node (the OSIS 400e) in the normal direction (i.e., west).

When the optical signal SigB enters into the internal interconnect fabric of the OSIS 400e, the optical signal SigB is duplicated, split and transmitted to the next node (OSIS 400d) continuously via the 1×2 internal interconnect splitter 482. When the optical signal SigB enters into the internal interconnect circuit of the destination OSIS 400d, the optical signal SigB is transmitted directly to the failover sub-module 490 of the OSIS 400d. At this moment, the failover sub-module 490 passes the optical signals which are on the normal path and transmits them to the 6×4 wavelength selective switch (i.e., the optical switching sub-module 460) of the OSIS 400d for wavelength selection and reception.

Figure 8A:
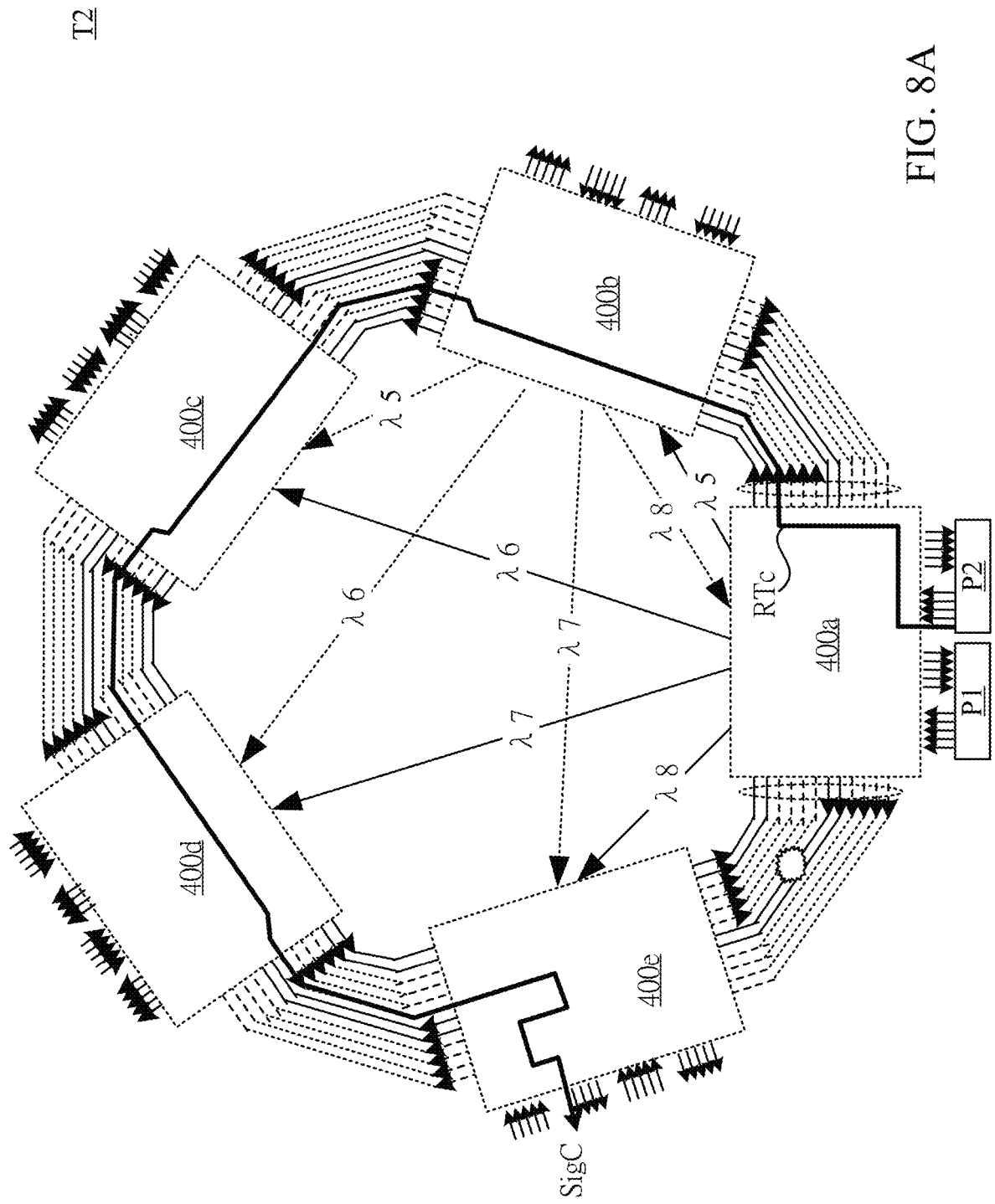
FIG. 8A is a schematic diagram of operation of a protection fabric in accordance with some embodiments of the present disclosure.

Please refer to FIG. 8A. FIG. 8A is a schematic diagram of the operation of a protection fabric in accordance with some embodiments of the present disclosure. As shown in FIG. 8A, it is assumed that the ribbon fiber between the OSIS 400a and the OSIS 400e is disconnected, thereby causing the OSIS 400a to be not able to transmit the optical signal SigC to the west through the normal path to the OSIS 400e and the optical signals to the OSIS 400d. At this time the failover sub-module 490 of the OSIS 400e detects that the intensity of the light of the first OSIS at the east becomes weaker, thus automatically switches the connection to the protection path RTc.

In fact, if the ribbon fiber between the OSISs 400a and 400e is disconnected, it will also affect the signal transmission of other OSISs.

In the present embodiment, the statuses of every OSISs 400a-400e receiving the optical signals from other two OSISs at the east/west are shown as table 2 below.

TABLE 2

(Receiving optical signals statuses of the OSIS)

| optical signal receiving status | First OSIS at the east | Second OSIS at the east | First OSIS at the west | Second OSIS at the west |
|---|---|---|---|---|
| 400a | O | O | X | X |
| 400b | O | O | O | X |
| 400c | O | O | O | O |
| 400d | O | X | O | O |
| 400e | X | X | O | O |

In Table 2, mark O represents that optical signals may be received through the normal path, and mark X represents that optical signals may not be received through the normal path and it is necessary to, by the failover sub-module 490, switch the connection to the protection path in order to receive optical signals. Therefore, only OSIS 400c is not affected by the disconnection of the ribbon fibers. Some of receiving paths of the other OSISs are affected by the disconnection of ribbon fiber, and it is needed to switch the connection to the protection paths via the failover sub-module 490.

In fact, under normal circumstances, the optical signal SigC will be duplicated into two beams through the interconnect splitter 485 of the OSIS 400a and simultaneously sent to the normal path (i.e., the first lateral transmission optical signal to the west) and the protection path (i.e., the path RTc to the east of the second lateral transmission optical signal). When the optical signal SigC is transmitted to the east via the protection path, it will transit two nodes (the OSISs 400b and 400c) without passing through its internal interconnect splitters, and then transmitted to the OSIS

400*d*. When the optical signal SigC enters into the internal interconnect circuit of the OSIS 400*d*, it is duplicated, split to the east via the 1×2 interconnect splitter 483 and continuously transmitted to the next node (the OSIS 400*e*).

Finally, when the optical signal SigC enters into the internal interconnect circuit of the OSIS 400*e* as the destination, it is directly transmitted to the failover sub-module 490 of the OSIS 400*e*. At this time, the failover sub-module 490 switches the connection to the protection path, so the optical signal SigC will pass through and be transmitted to the 6×4 wavelength selective switch (i.e., the optical switching sub-module 460) of the OSIS 400*e* for wavelength selection and reception.

Accordingly, the optical switches 492, 494, 496 and 498 of the failover sub-module 490 in the OSIS 400*a* can receive respectively, through the normal fabric, the first lateral transmission optical signal from the corresponding one of the other OSISs 400*b*-400*e*. By receiving the second lateral optical signal via the protection fabric, one of the first lateral transmission optical signal and the second lateral transmission optical signal can be output, corresponding to the selective signal SS, to the optical switching sub-module 460. In this way, when the normal fabric is disconnected, or other failures causes the first lateral transmission optical signal disappeared, or intensity decreased, the corresponding optical switches 492, 494, 496 and 498 can switch to the protection path and perform signal transmission with the second lateral transmission optical signal.

Please refer to FIG. 6 again. As shown in FIG. 6, except the optical switches 492, 494, 496 and 498 in the failover sub-module 490, there are four tap photodetectors (tap PD) 491, 493, 495 and 497 disposed in the failover sub-module 490. As mentioned in the previous paragraphs, the 2×1 optical switches 492, 494, 496 and 498 are configured to receive the optical signals from the normal path (solid line) and the protection path (dash line) of each two OSISs in the east and the west, respectively.

As shown in the figure, the optical signals entering into the normal path and the protection path of the same 2×1 optical switches 492, 494, 496 and 498 are transmitted in the normal direction and reverse direction from the source terminal by being duplicated and split via utilizing the interconnect splitter 485 and 486. Thus, the data carried by the two optical signals is the same. The default switch setting of each 2×1 optical switch 492, 494, 496 and 498 is to allow the optical signals in the normal path to pass.

In addition, in some embodiments, the function of the tap PDs 491, 493, 495 and 497 is to convert around 2% of optical input power into the corresponding current value and then through analog-to-digital converter convert to the corresponding voltage value, such that the optical switches 492, 494, 496 and 498 can perform switch according to the voltage value respectively.

For example, when the voltage value is lower than a threshold value (i.e., a wire disconnected or a poor signal is detected), a micro-control unit (MCU) 410 in the OSIS 400*a* outputs signal SS to switch the corresponding 2×1 optical switches 492, 494, 496 and 498 to change to pass the optical signals of the protection path. Accordingly, the micro-control unit 410 can be configured to output the selective signal SS to the failover sub-module 490 in order to control the failover sub-module 490 to output the second lateral transmission optical signal when the intensity of the first lateral transmission optical signal is lower than the threshold value.

Figure 8B:
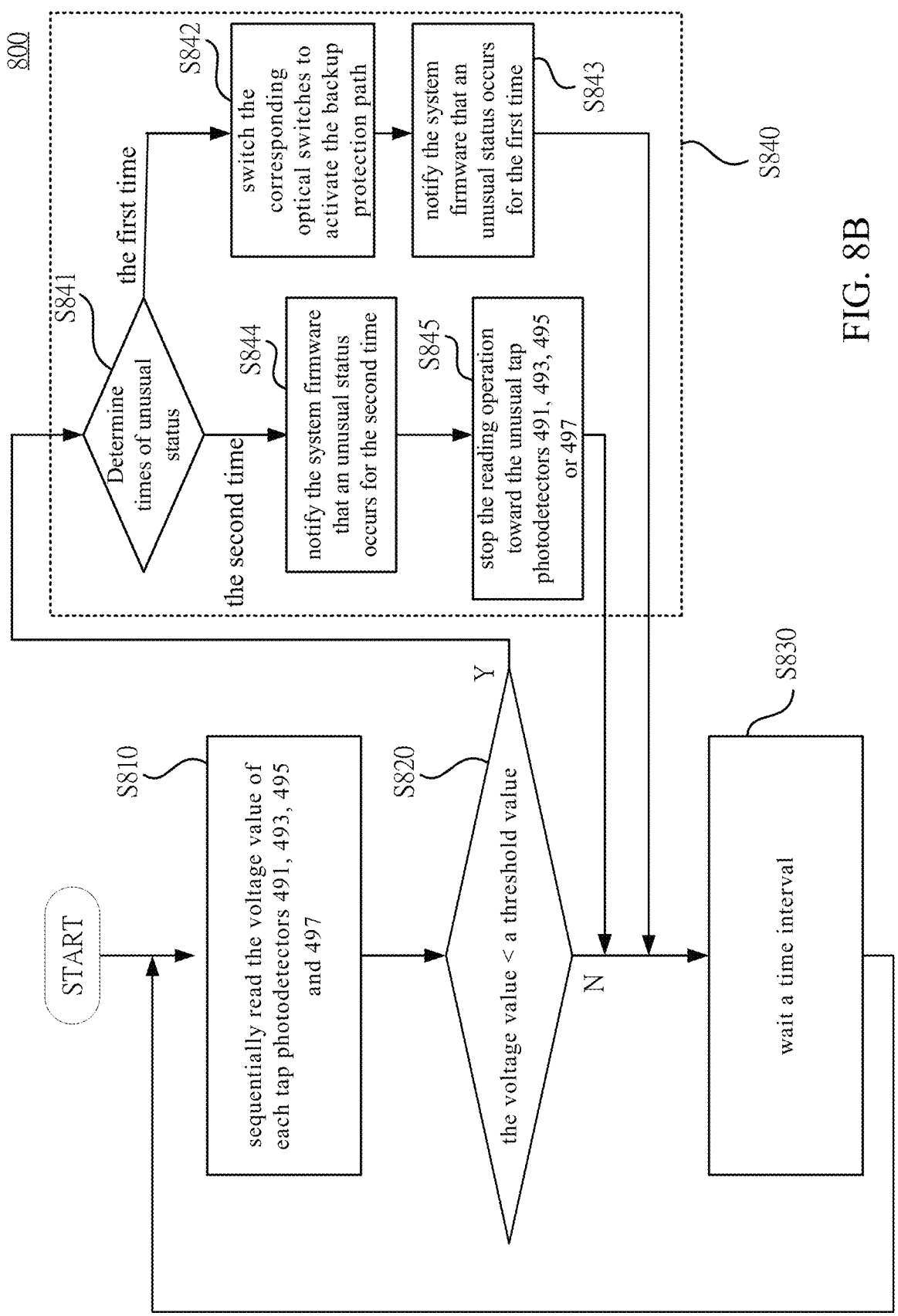
FIG. 8B is a flow chart of the determination method of the micro-control unit 410 in the polling mechanism in accordance with some embodiments of the present disclosure.

Specifically, there are two different ways for the micro-control unit 410 to determine when to activate the optical path switch. First, the first diagnostic mechanism for determining is a polling mechanism. Please refer to the FIG. 8B. FIG. 8B is a flow chart of the determination method 800 of the micro-control unit 410 in the polling mechanism in accordance with some embodiments of the present disclosure. In the polling mechanism, the micro-control unit 410 can continuously and actively supervise the voltage status of each tap PD 491, 493, 495 and 497. If the disconnection occurs, optical switches are performed to be switched. In some embodiments, the micro-control unit 410 can execute a driver program to perform the corresponding operation of the determination method 800.

As shown in FIG. 8B, the determination method 800 includes steps S810-S840. First, in step S810, it is to utilize the driver program in the micro-control unit 410 to read the voltage value of each tap PD 491, 493, 495 and 497 sequentially. Moreover, in step S820, it is to compare the voltage values read by the tap PDs 491, 493, 495 and 497 with the default threshold values respectively.

When the voltage values are larger than the threshold value, step 830 is performed and steps S810-S830 are repeated with a time interval (i.e., five seconds).

When the voltage values are less than the threshold value, step S840 is performed to execute the unusual processing procedure. Step S840 further includes steps S841-S845. First, in step S841, the number of times of unusual status is determined based on the system record of the system firmware. In other words, the driver program can determine whether the unusual status was detected for the first time or the second time.

When it is the first time that the driver program detects the voltage value of one of the tap PDs 491, 493, 495 and 497 is less than the default threshold value, the corresponding normal receiving path can be regarded as a fault condition and the step S842 and step S843 are performed. In the step S842, the micro-control unit 410 outputs the selective signal SS to switch the corresponding 2×1 optical switches 492, 494, 496 and 498, such that the optical signals of the backup protection path can pass. In S843, the micro-control unit 410 outputs the unusual information signal to notify the system firmware that one of the tap PDs 491, 493, 495 and 497 occurs an unusual status for the first time.

When it is the second time that the driver program detects the voltage value of one of the tap PDs 491, 493, 495 and 497 is continuously less than the default threshold value, the micro-control unit 410 won't perform switch to the corresponding 2×1 optical switches 492, 494, 496 and 498 and the step S844 and step S845 are performed. In the step S844, the micro-control unit 410 outputs the unusual information signal to notify the system firmware that one of the tap PDs 491, 493, 495 and 497 occurs an unusual status for the second time. Afterward, in step S845, the micro-control unit 410 stops the operation of polling toward the unusual tap PD 491, 493, 495 or 497 to read its status.

When the ribbon fiber is repaired, the system firmware notifies the driver to perform the recovery operation for switching all 2×1 optical switches 492, 494, 496 and 498 to the original normal path. It should be noted that in the determination method 800 because the micro-control unit 410 continuously interrogates the voltage status and makes a determination whether the path is disconnected, some of the computing resources of the micro-control unit 410 are consumed.

On the other hand, the second diagnostic mechanism for determining is a interrupt mechanism. In the interrupt mechanism, the micro-control unit 410 does not usually supervise the status of the tap PDs 491, 493, 495 and 497.

When the disconnection occurs, the micro-control unit 410 is interrupted and triggered to confirm the states of the tap PDs 491, 493, 495 and 497 and the path switching of the corresponding 2×1 optical switches 492, 494, 496 and 498 is performed.

Figure 8D:
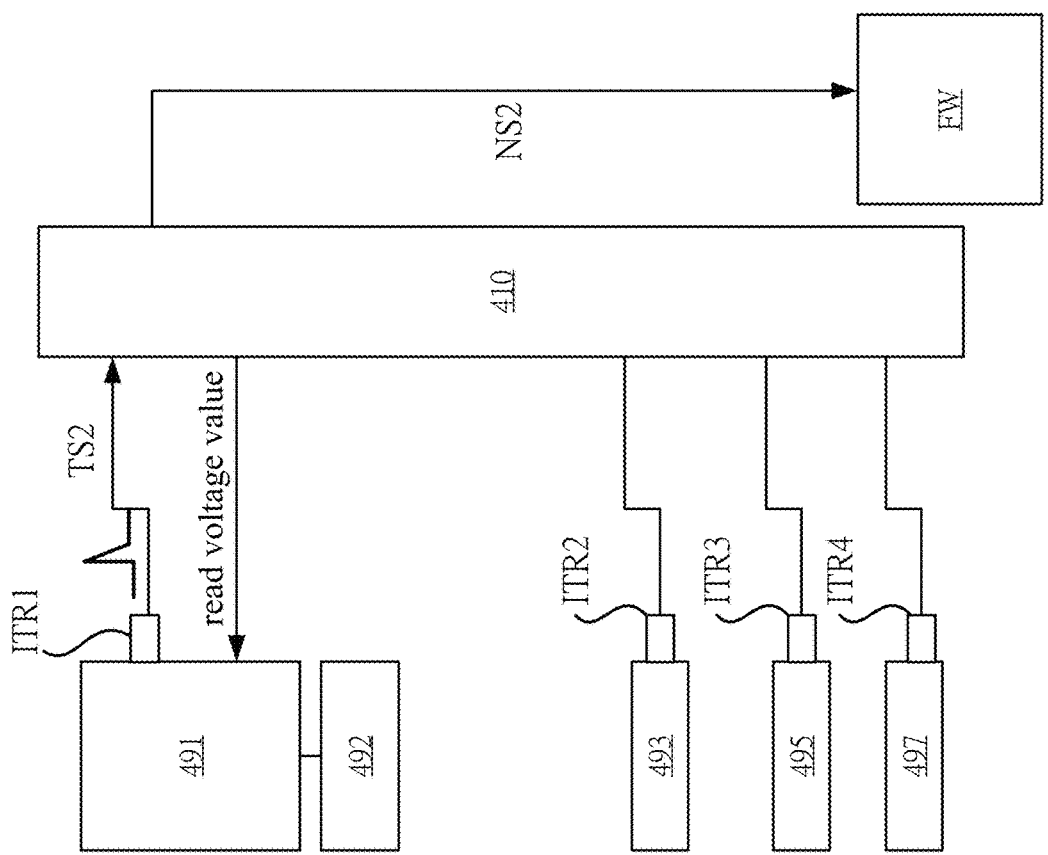
FIG. 8C and FIG. 8D are schematic diagrams of operations of the micro-control unit executing the interrupt mechanism in accordance with some embodiments of the present disclosure.
Figure 8C:
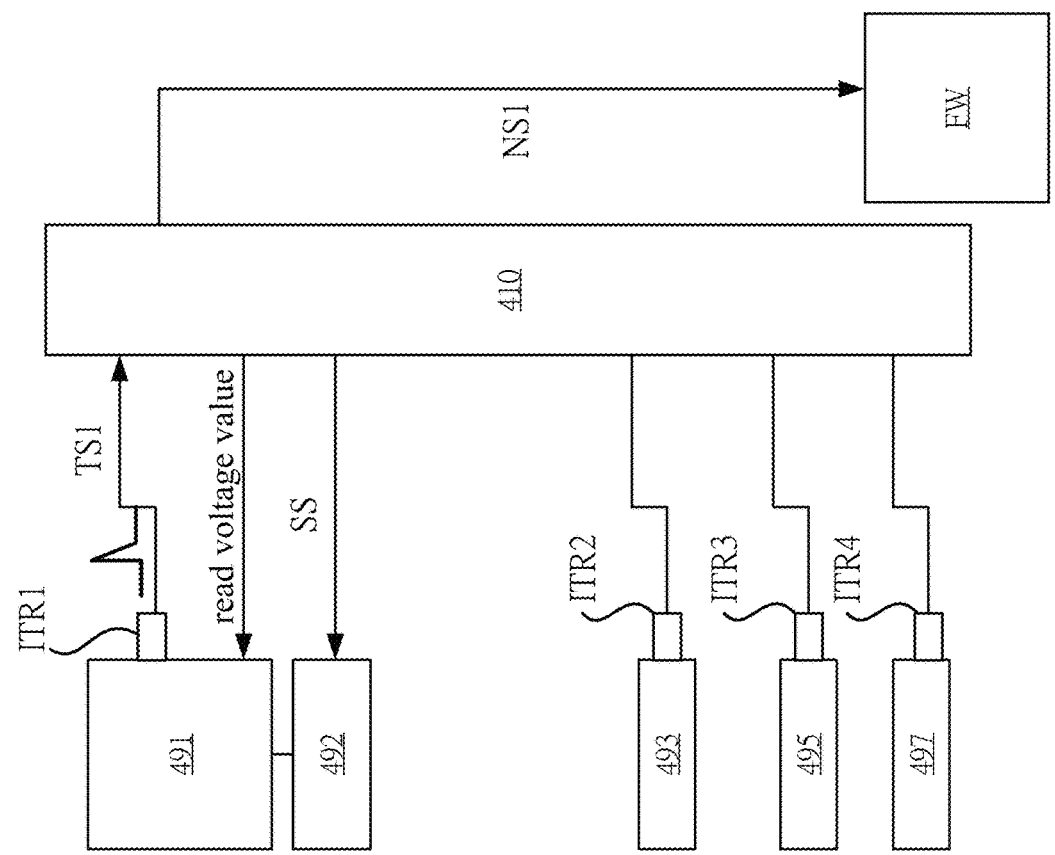

Please refer to FIG. 8C and FIG. 8D. FIG. 8C and FIG. 8D are schematic diagrams of operations of the micro-control unit 410 executing the interrupt mechanism in accordance with some embodiments of the present disclosure. As shown in FIG. 8C, the tap PDs 491, 493, 495, and 497 include interrupt pins ITR1-ITR4 connected to the micro-control unit 410 respectively. Taking the tap PD 491 as an example, when the voltage value of the tap PD 491 is less than the threshold value for the first time, the corresponding interrupt pins ITR1-ITR4 are triggered and a trigger signal TS1 is output to notify the micro-control unit 410. Upon receiving the trigger signal TS1, the micro-control unit 410 executes a corresponding driver program to perform operations similar to the determination method 800.

Specifically, at this time, the micro-control unit 410 first reads the voltage value of the tap PD 491 to confirm that it is less than the threshold value. When the voltage value is less than the threshold value, the micro-control unit 410 determines the amount of unusual status according to the system record of the system firmware FW.

When it is the first time that the micro-control unit 410 detects the voltage value of the tap PD 491 is less than the default threshold value, the normal receiving path can be regarded as a fault condition and the step S842 and step S843 are performed. In the step S842, the micro-control unit 410 outputs the selective signal SS to switch the corresponding 2×1 optical switches 492, such that the optical signals of the backup protection path can pass. In S843, the micro-control unit 410 outputs the unusual information signal NS1 to notify the system firmware FW that the tap PD 491 occurs an unusual status for the first time.

Similarly, as shown in FIG. 8D, when the voltage value of the tap PD 491 is less than the threshold value for the second time, the interrupt pin ITR1 is triggered again and a trigger signal TS2 is output to notify the micro-control unit 410. At this time, the micro-control unit 410 reads the voltage value of the tap PD 491 again to confirm that the value is less than the threshold value.

When it is the second time that the micro-control unit 410 detects the voltage value of one of the tap PD 491 is continuously less than the default threshold value, the micro-control unit 410 will not perform switch to the 2×1 optical switch 492 and the step S844 and step S845 are performed. In the step S844, the micro-control unit 410 outputs the unusual information signal NS2 to notify the system firmware FW that the tap PD 491 occurs an unusual status for the second time.

Similarly, when the ribbon fiber is repaired, the system firmware FW notifies the micro-control unit 410 and performs the recovery operation through the driver program to switch all 2×1 optical switches 492, 494, 496 and 498 to the original normal path.

In summary, through the polling mechanism illustrated in FIG. 8B or the interrupt mechanism illustrated in FIG. 8C and FIG. 8D, the micro-control unit 410 can control the failover sub-module 490 to selectively perform the optical signal transmission via the normal path or the protection path in order to implement an interconnect protection path design between the OSISs 400a-400e in the second tier network T2.

Such a result, when one ribbon fiber of the second tier network T2 is disconnected, the optical signals can still be transmitted to the destination OSISs 400a-400e via the protection path, so that the transmission of optical signals will not be affected.

Figure 9:
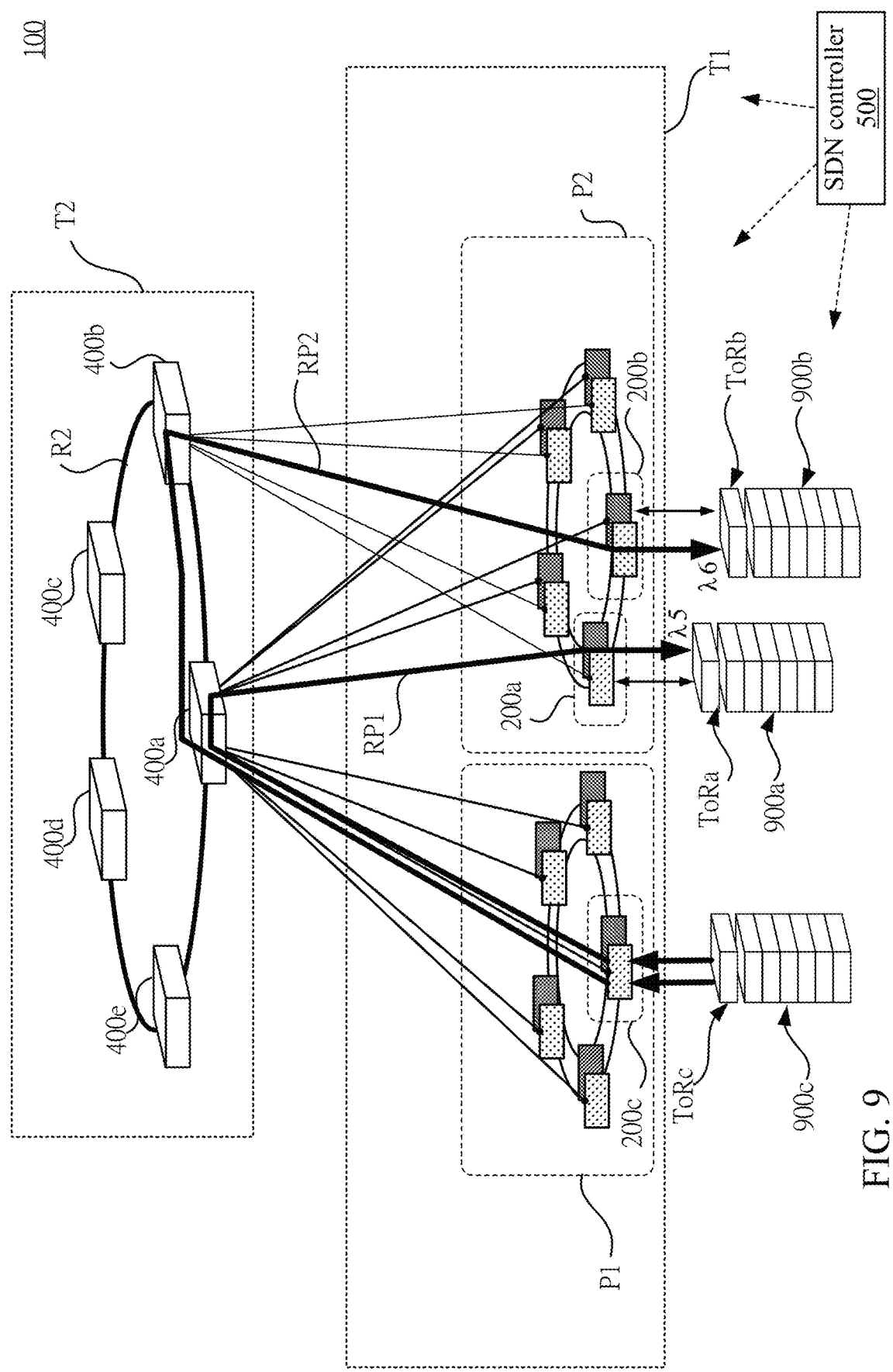
FIG. 9 is a schematic diagram of inter-Pods optical tunnel paths between the pods in accordance with some embodiments of the present disclosure.

Please refer to FIG. 9. FIG. 9 is a schematic diagram of inter-Pods tunnel paths between the pods in accordance with some embodiments of the present disclosure. In the embodiment in FIG. 9, the rack 900c in pod P1 will transmit optical signals to the racks 900a and 900b in another pod P2. The software-defined network controller 500 can be configured to build two inter-Pod optical tunnels. Specifically, the optical tunnel includes an optical transmission path and a selected wavelength. The optical tunnel between the rack 900c and the rack 900a is a path RP1 via the rack 900c passing through the ToR switch TORc, the OADS 200c, the OSIS 400a, the OADS 200a, and the ToR switch TORa to the rack 900a, and is formed by selecting wavelength λ5 to transmit optical signals.

On the other hand, the optical tunnel between the rack 900c and the rack 900b is a path RP2 via the rack 900c passing through the ToR switch TORc, the OADS 200c, the OSIS 400a, the OSIS 400b, the OADS 200b and the ToR switch TORb to the rack 900b, and is formed by selecting wavelength λ6 to transmit optical signals.

In order to build the two optical tunnels, it is necessary to set the OADSs 200a-200c along the path and the 6×4 wavelength selective switches (i.e., the optical switching sub-module 460) of the OSISs 400a and 400b to select a specific wavelength to pass.

Figure 10A:
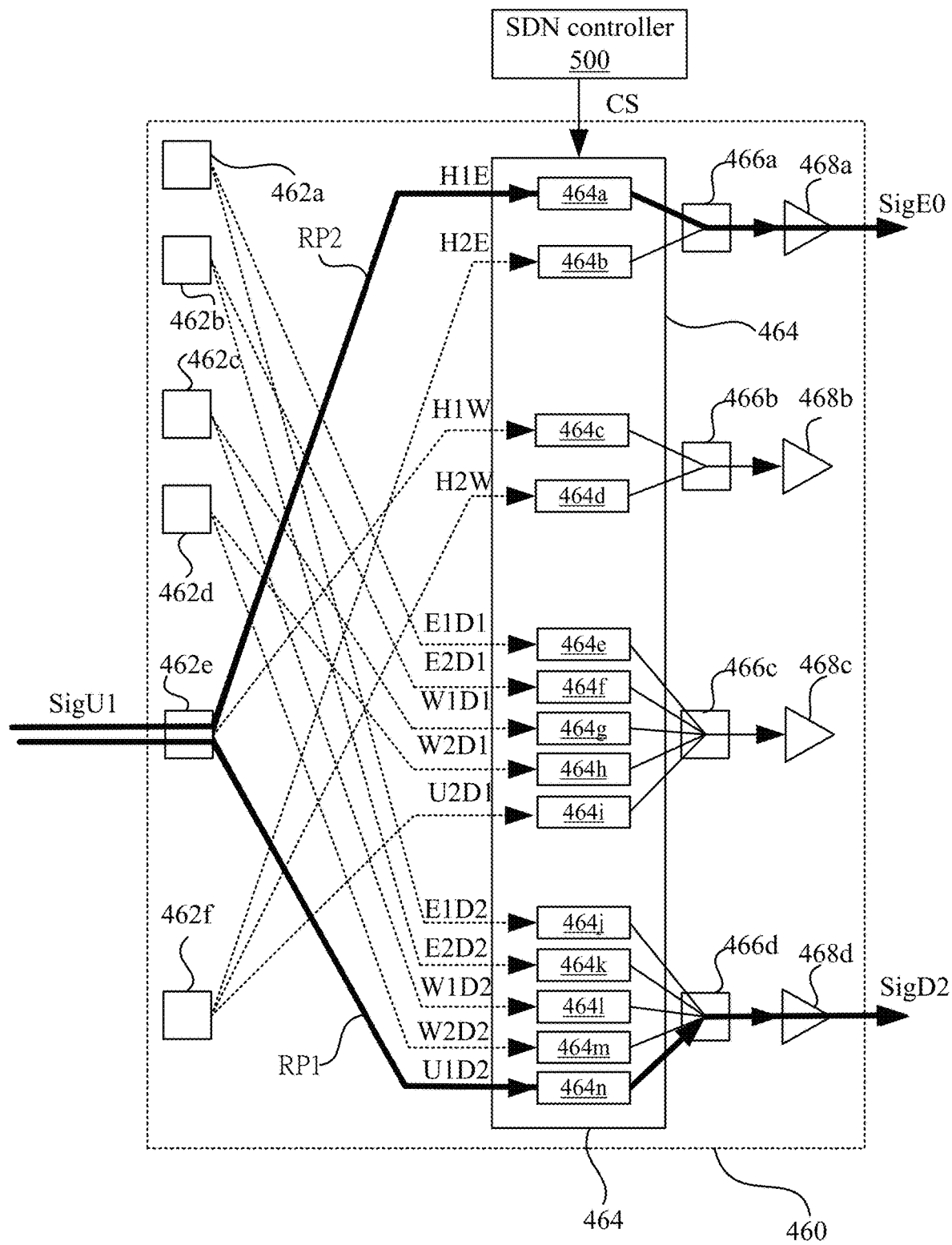
FIG. 10A and FIG. 10B are schematic diagrams of setup of the optical switching sub-modules of the optical switch interconnect sub-system, respectively, in accordance with some embodiments of the present disclosure.
Figure 10B:
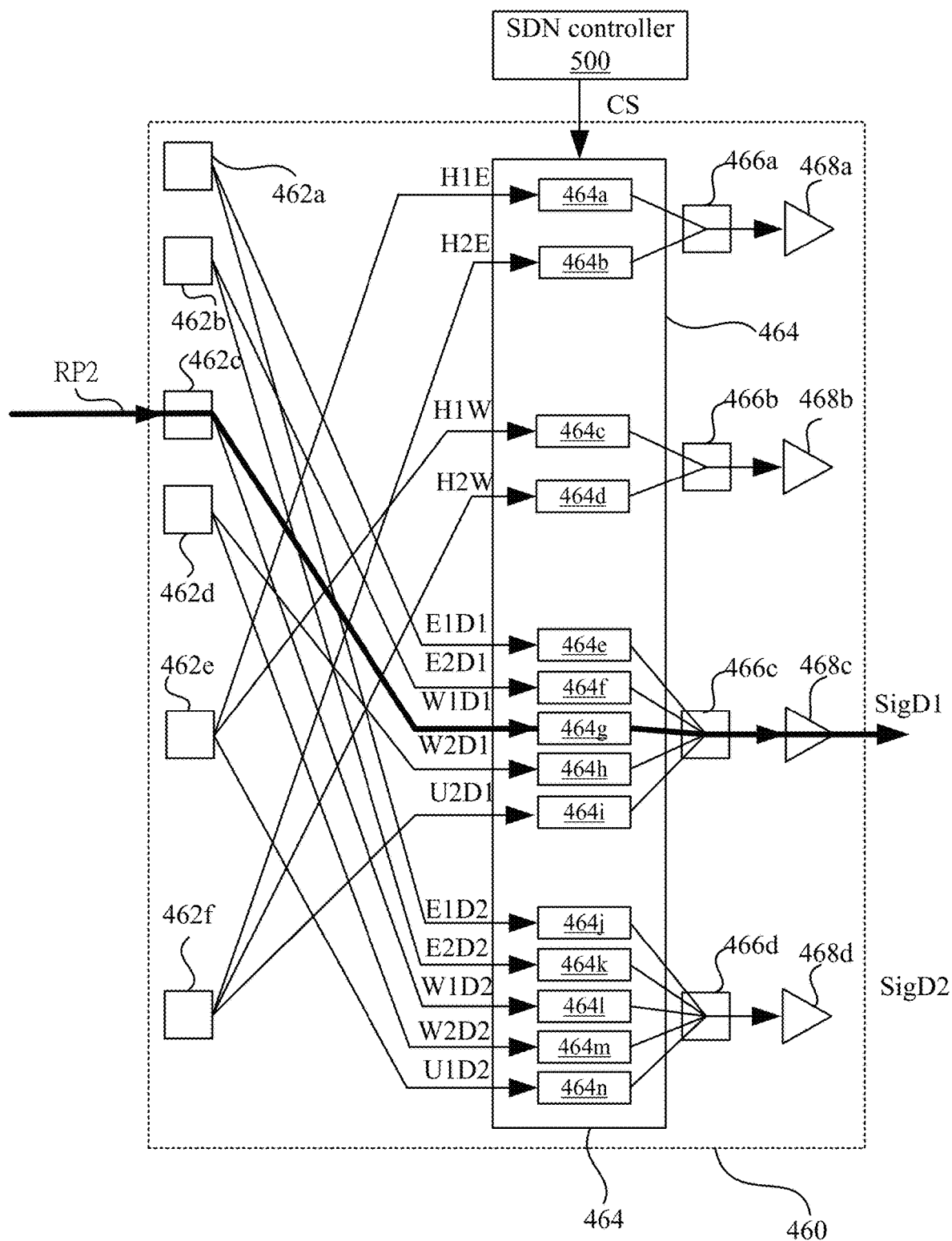

Please refer to FIG. 10A and FIG. 10B. FIG. 10A and FIG. 10B are schematic diagrams of the setup of the OSIS 400a and the optical switching sub-module 460 of the OSIS 400b, respectively, in accordance with some embodiments of the present disclosure. As shown in FIG. 10A, for the path RP1, the optical tunnel can be built by setting one 1×1 wavelength selective switch 464n of the OSIS 400a and one 1×1 wavelength selective switch corresponding to the 2×1 wavelength selective switch WSS21 in the second transmission module 220 of the OADS 200a at the destination.

On the other hand, as shown in FIG. 10A and FIG. 10B, for the path RP2, the optical tunnel can be built by setting the 1×1 wavelength selective switch 464a of the OSIS 400a, the 1×1 wavelength selective switch 464g of the OSIS 400b and one 1×1 wavelength selective switch corresponding to the 2×1 wavelength selective switch WSS11 in the first transmission module 210 of the OADS 200b at the destination.

In this way, in the process of transmission, first, the optical signals with the wavelengths λ5 and λ6 are transmitted, via the corresponding DWDM transceivers on the input-output port of the ToR switch ToRc on the rack 900c, to the corresponding add-port of the first transmission module 210 of the OADS 200c, combined into one optical fiber through the multiplexer 212, duplicated, split via 2×2 first splitter SP11, transmitted northward to the corresponding add-port in the OSIS 400a and after being combined into one composite optical signal SigU1 by the multiplexer BMUX1, transmitted to the optical switching sub-module 460. At this time, the optical signals with wavelength λ5 and λ6 are duplicated and split through the splitter 462e into three beams. One beam is transmitted eastward to other OSISs, another is transmitted westward to other OSISs, and finally the other is transmitted southward to the OADSs 200a and 200b at the destination pod P2.

The optical signal transmitted by the OADS 200a to the south destination pod P2 passes while the wavelength selective switch 464n selects the wavelength λ5 to pass, then duplicated and combined, by the 5×1 output combiner 466d, into one optical path, and then the optical power is amplified by the optical signal amplifier 468d. The splitter SPLT2 duplicates, splits the composite signal SigD2 and transmits it to each OADS in the destination pod P2.

As shown in FIG. 9, the optical signal transmitted to the second transmission module 220 of the OADS 200a passes while the 1×1 wavelength selective switch corresponding to a reception in the 2×1 wavelength selective switch (please refer to the wavelength selective switch WSS21 in FIG. 2) selects the wavelength λ5 to pass, and is transmitted to the demultiplexer 226. The optical signal with wavelength λ5 is transmitted from the fifth drop-port of the demultiplexer (can be referred to the demultiplexer 226 of the second transmission module 220 in FIG. 2) in the second transmission module 220 of the OADS 200a to the receiver of the corresponding DWDM transceiver on the input-output port of the ToR switch ToRa on the rack 900a. The optical signal transmission from rack 900c to 900a is accomplished.

On the other hand, the optical signal transmitted eastward passes while the wavelength selective switch 464a selects the wavelength λ6 to pass, then duplicated and combined, by the 2×1 output combiner 466a, into one optical path, and then the optical power is amplified by the optical signal amplifier 468a as the composite optical signal SigE0. The optical signal is transmitted eastward via the interconnection fabric module 480 between the OSIS 400a and 400b to the OSIS 400b.

As shown in FIG. 10B, after the optical signal is transmitted to the optical switching sub-module 460 of the OSIS 400b, the optical signal with wavelength λ6 is duplicated and split, by the 1×2 splitter 462c, into two beams. One beam of the optical signal is transmitted southward to each OADS in the destination pod P2, and the other beam of the optical signal is transmitted southward to each OADS in another pod.

The optical signal transmitted southward to the destination pod P2 passes while the wavelength selective switch 464g selects the wavelength λ6 to pass, then duplicated and combined, by the 5×1 output combiner 466c, into one optical path, and then the optical power is amplified by the optical signal amplifier 468c as the composite optical signal SigD1. The splitter SPLT1 duplicates, splits the composite signal SigD1 and transmits it to each OADS in the destination pod P2.

The optical signal transmitted to the first transmission module 210 of the OADS 200b passes while the 1×1 wavelength selective switch corresponding to a reception in the 2×1 wavelength selective switch (please refer to the wavelength selective switch WSS11 in FIG. 2) selects the wavelength λ6 to pass, and is transmitted to the demultiplexer 216. The optical signal with wavelength λ6 is transmitted from the sixth drop-port of the demultiplexer (can be referred to the demultiplexer 216 of the first transmission module 210 in FIG. 2) to the receiver of the corresponding DWDM transceiver on the input-output port of the ToR switch ToRb on the rack 900b. The optical signal transmission from rack 900c to 900b is accomplished.

Figure 11A:
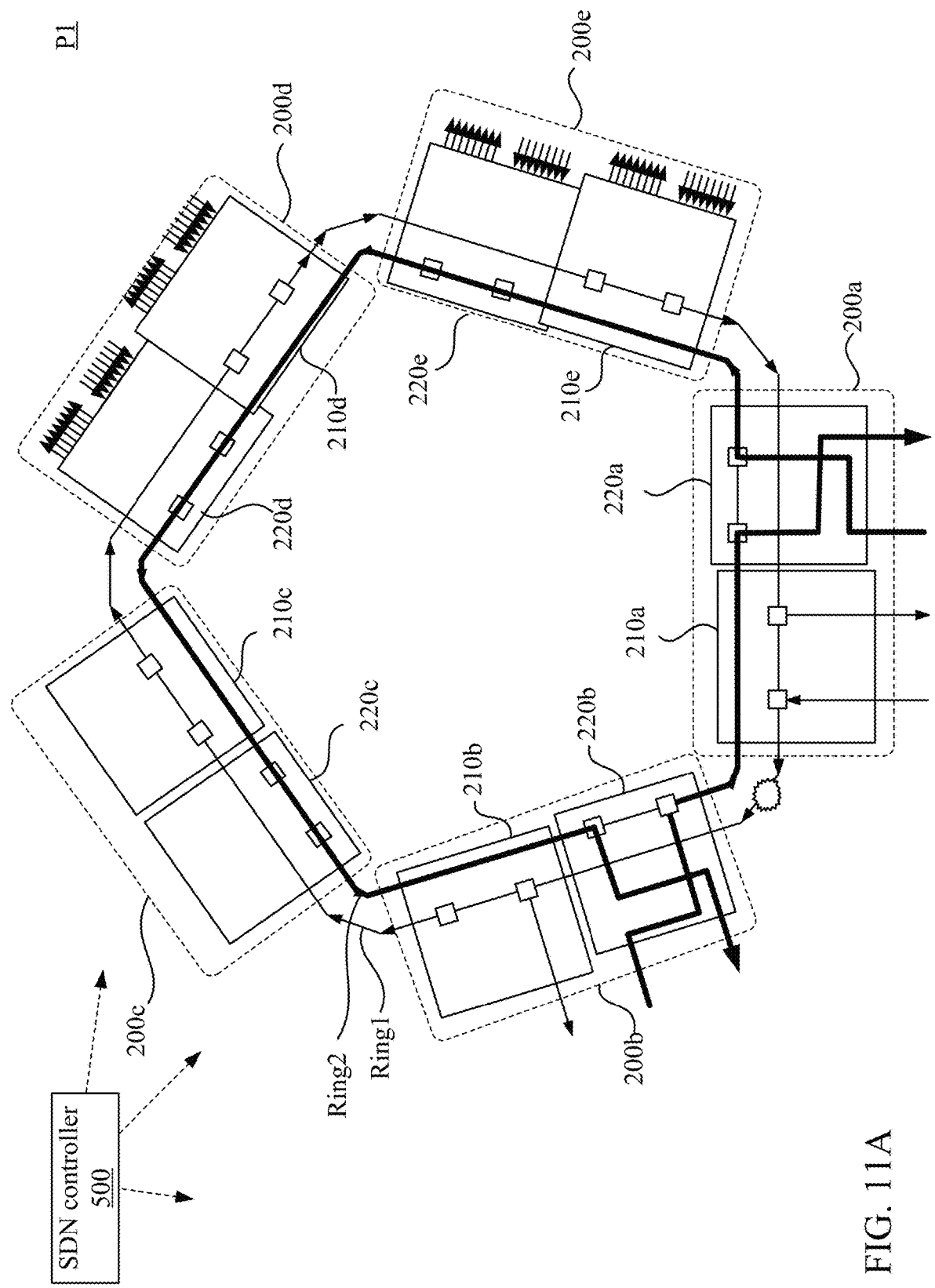
FIG. 11A is a schematic diagram of a design of a protection path in the pod of the first tier network in accordance with some embodiments of the present disclosure.

In addition, it should be noticed that except the protection paths of the OSISs 400a-400e in the foregoing second tier network T2, the path protection can also be implemented through the independent transmission rings Ring1 and Ring2 between each OADSs 200a-200e in the same pod P1 in the first tier network T1 and between the first tier network T1 and the second tier network T2. When the fiber is disconnected or the fiber connector is damaged, the protection path can be used to transmit the optical signal to ensure that the entire optical tunnel network is not affected by the fiber disconnected. For the sake of explanation, please refer to FIG. 11A. FIG. 11A is a schematic diagram of a design of a protection path in the pod P1 of the first tier network T1 in accordance with some embodiments of the present disclosure.

As shown in FIG. 11A, since each pod P1 in the first tier network T1 includes a plurality of independent transmission rings Ring1 and Ring2, when one of the rings (for example, the transmission ring Ring1) is disconnected, the optical signal transmission can be carried out through other transmission ring Ring2 to achieve the purpose of protection path. In addition, since the fibers of the transmission rings Ring1 and Ring2 are independently separated, the probability of simultaneous disconnection of the two independent fibers is very low.

In this embodiment, when the optical fiber of the transmission ring Ring1 corresponding to each of the first transmission modules 210 in the pod P1 is disconnected, the first transmission module 210 of some OADSs cannot transmit optical signals westward to other OADSs. For example, the first transmission module 210 of the OADS 200a cannot transmit optical signals westward to other OADSs 200b-200e in the same pod P1. At this time, the OADSs 200a-200e that cannot transmit the optical signals by utilizing the transmission ring Ring1, by the software-defined network controller 500 setting the corresponding ToR switch and the wavelength selective switch through which optical signals must pass on the path, transmit the optical signal via the second transmission module 220 using the transmission ring Ring2 to transmit optical signals eastward to other OADSs 200a-200e.

Furthermore, in fact, when the transmission ring Ring1 and Ring2 are simultaneously disconnected and the position where the disconnection meets specific criteria, by resetting the wavelength selective switches WSS11, WSS12, WSS21, WSS22 of each OADS in the pod and each ToR switch through the software-defined network controller 500, all the OADSs 200a-200e can interconnect with each other.

Figure 11B:
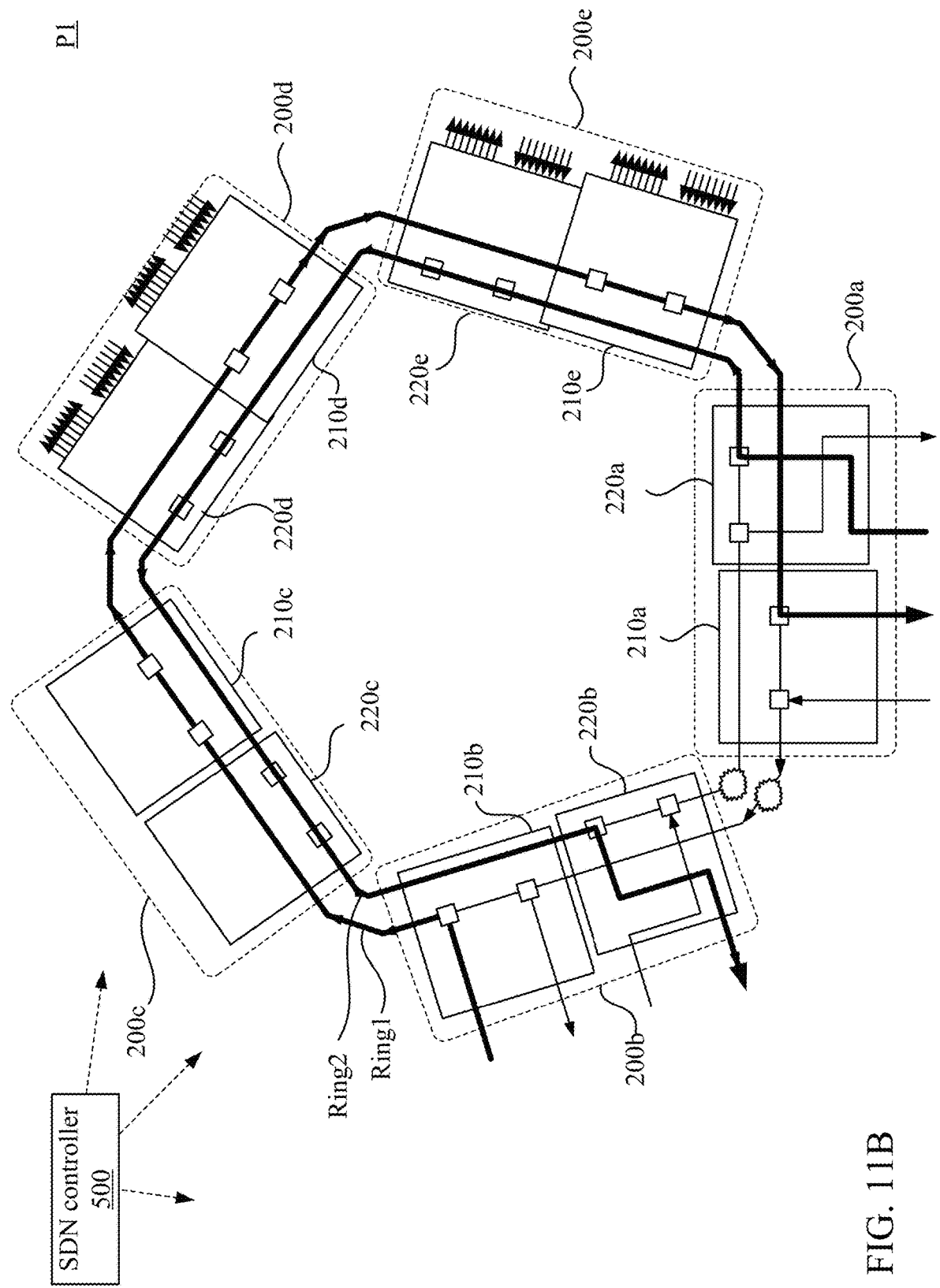
FIG. 11B is a schematic diagram of a design of a protection path in the pod of the first tier network T1 in accordance with some embodiments of the present disclosure.

Please refer to FIG. 11B. FIG. 11B is a schematic diagram of a design of a protection path in the pod P1 of the first tier network T1 in accordance with some embodiments of the present disclosure. As shown in FIG. 11B, when the transmission ring Ring1 and Ring2 are disconnected at the same connection point (i.e., between the OADSs 200a and 200b), and there is only one connection point in one pod P1 at which the two transmission rings Ring1 and Ring2 are disconnected at the same time, the affected OADSs 200a-200e can be reset, by the software-defined network controller 500 setting the ToR switch and the wavelength selective switch through which the optical signals pass on the path, and interconnect to other OADSs 200a-200e. Taking the OADSs 200a and 200b as examples, when the transmission ring Ring1 is disconnected, for the OADS 200a, the software-defined network controller 500 can set the ToR switch and the wavelength selective switch through which the optical signals pass on the path, so that the optical signal is transmitted with the wavelength of the second transmission module 220a eastward by the transmission ring Ring2 to the OADS 200b. On the other hand, for the OADS 200b, the software-defined network controller 500 can set the ToR switch and the wavelength selective switch through which the optical signals pass on the path, so that the optical signal is transmitted with the wavelength of the first transmission module 210b westward by the transmission ring Ring1 to the OADS 200a, and so on.

In other words, the software-defined network controller 500 can be configured to set correspondingly, when optical path of the OADS 200*a* to the OADS 200*b* on the transmission ring Ring1 is disconnected, the ToR switch and the wavelength selective switch through which the optical signals pass on the path in order to build the optical tunnel from the OADS 200*a* to the OADS 200*b* on the transmission ring Ring2 through the second transmission modules 220*a*-220*e*. In some embodiments, the software-defined network controller 500 can be configured to set correspondingly, when optical path of the OADS 200*b* to the OADS 200*a* on the transmission ring Ring2 is disconnected, the ToR switch and the wavelength selective switch through which the optical signals pass on the path in order to build the optical tunnel from the OADS 200*b* to the OADS 200*a* on the transmission ring Ring1 through the first transmission modules 210*a*-210*e*.

Figure 12:
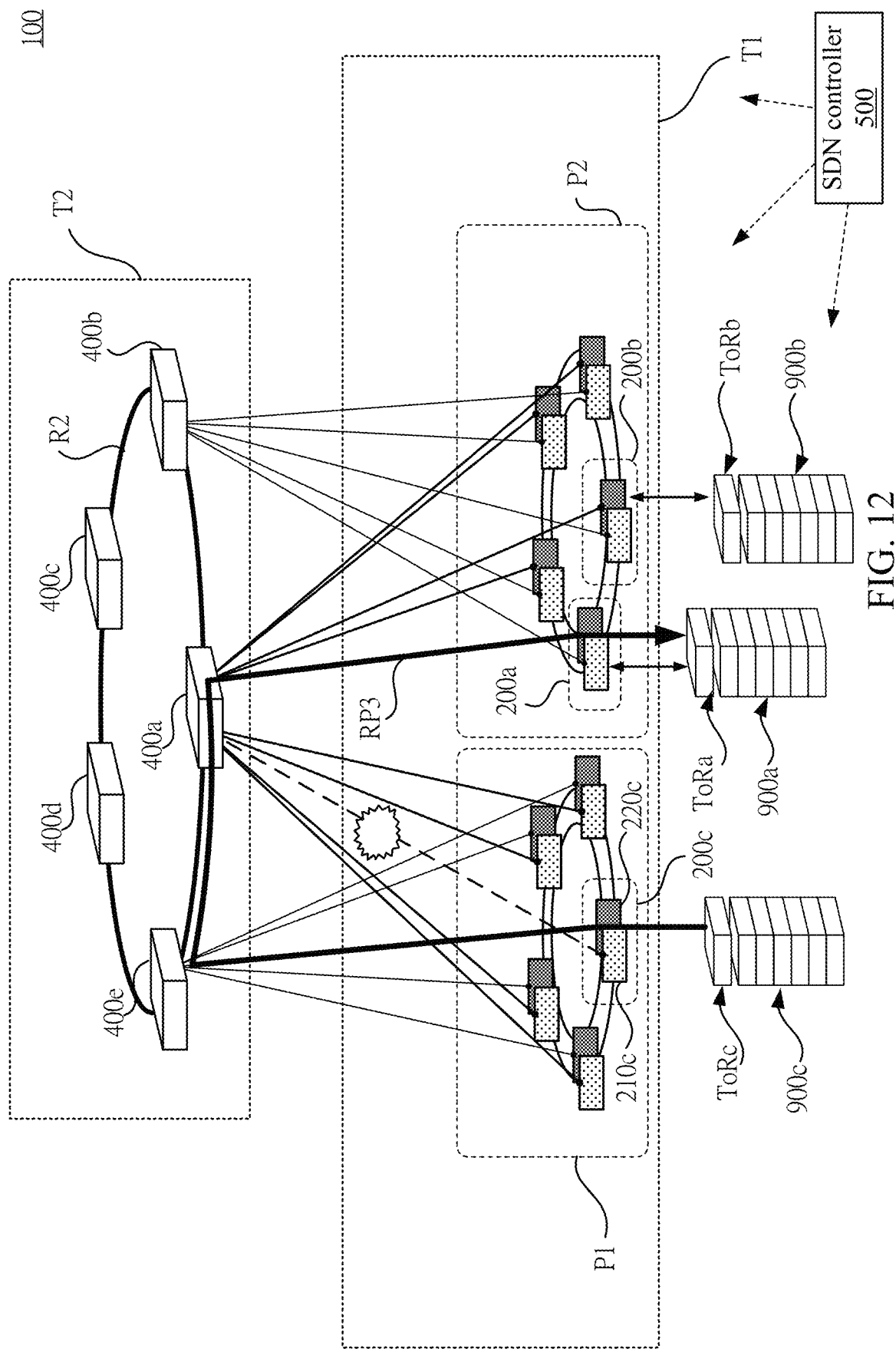
FIG. 12 is a schematic diagram of a design of a protection path between the first tier network and the second tier network in accordance with some embodiments of the present disclosure.

Please refer to FIG. 12. FIG. 12 is a schematic diagram of a design of a protection path between the first tier network T1 and the second tier network T2 in accordance with some embodiments of the present disclosure. As mentioned in the previous paragraphs, each OADSs 200*a*-200*e* is connected to the adjacent two OSISs 400*a*-400*e* in the second tier network T2 via optical fibers. For example, the first transmission module 210*c* and the second transmission module 220*c* of the OADS 200*c* having one pair of optical fiber separately are connected to the two adjacent OSISs 400*a* and 400*e* respectively. Thus, when the optical fiber connecting the OADS 200*c* to the OSIS 400*a* is disconnected, the OADS 200*c* can utilize another optical path to transmit the optical signals to the another OSIS 400*e* and then transit them to the destination OSIS 400*a* to achieve another purpose of the protection path.

Taking FIG. 12 as an example, the same with the embodiment in FIG. 9, in the present embodiment, the rack 900*c* in the pod P1 will transmit optical signals to the rack 900*a* in another pod P2. It is assumed that the optical fiber connecting the first transmission module 210*c* of the OADS 200*c* and the OSIS 400*a* is disconnected. The optical signals can be transmitted, through the software-defined network controller 500 setting the ToR switch and the wavelength selective switch through which the optical signals pass on the path to select the wavelength of the second transmission module 220 to transmit the optical signal, to another OSIS 400*e* and transited to the destination OADS 200*a*. As the path RP3 shown in the figure, under some circumstance, the optical signals may be transmitted first from the OSIS 400*e* to another OSIS 400*a*, and then from the OSIS 400*a* to the destination OADS 200*a*. The specific details of end-to-end transmission are described in the previous paragraphs and will not be described again.

In other words, the software-defined network controller 500 can further be configured to, when the optical path from the OADS 200*c* to the OSIS 400*a* is disconnected, correspondingly set the ToR switch ToRc to build the optical tunnel from the OADS 200*c* to the OSIS 400*a* (i.e., the path RP3). Similarly, the software-defined network controller 500 can also be configured to, when the optical path from the OADS 200*c* to the OSIS 400*e* is disconnected, correspondingly set the ToR switch ToRc to build the optical tunnel from the OADS 200*c* to the OSIS 400*a*.

As a result, whether the optical fiber inside the first tier network T1 is disconnected, the optical fiber inside the second tier network T2 is disconnected, or the longitudinal transmission fiber between the first tier network T1 and the second tier network T2 is disconnected, the intelligence-defined optical tunnel network system 100 can build optical tunnels through the redundant path to realize signal transmission between the optical nodes to achieve data transmission between different servers in different racks.

In some embodiments of the present disclosure, each of the wavelength selective switches may be implemented by an array design consisted of one or more 1×1 (1 input and 1 output) wavelength blockers (WB). The wavelength blocker can be used by digital light processor (DLP) technology to increase the switching speed. In some embodiments, the array switching time is only about 100 microseconds (μs), so there is a faster and more instant all-optical data center network switching capability.

In summary, in various embodiments of the present disclosure, a new network structure is proposed, so that the intelligence-defined optical tunnel network system 100 can utilize the same wavelength repeatedly to save wavelength resources. In addition, in the first tier network T1, a ring-shaped structure is adopted, the amount of optical nodes in a single pod can be multiplied arbitrarily without replacing the internal structure, and the amount of transmission rings in the same pod can be multiplied as well. The incremental structure with more flexibility is achieved and has better expandability. For example, in the embodiment shown in FIG. 1, the first tier network T1 includes four pod P1-P4, but the present disclosure is not limited thereof. If the whole system needs to accommodate the information exchange between more racks, the amount of the pod can be increased under the condition of not changing the whole network structure, for instance, adding the fifth pod or furthermore adding the sixth pod, and so on. Furthermore, in the embodiment shown in FIG. 1, the amount of optical nodes included in the pod P1 is five, for example, five OADSs 200*a*-200*e*, but the present disclosure in not limited thereof. If the whole system needs to accommodate the information exchange between more racks, one or more nodes can be added to some pods (or all pods) under the condition of not changing the whole network structure. For example, when there is a need for expansion, the pod P1 can further include a new optical node, having a total of six optical nodes, and the pods P2-P4 can remain having five optical nodes. If there is a need for expansion, new optical nodes can be added to other pods (i.e., the pod P2), and so on. Through this, the incremental structure is disposed.

On the other hand, the optical switch paths in the second tier network T2 are simplified, and the protection paths between each of optical fibers transmission are designed. Whether the optical fiber inside the first tier network T1, inside the second tier network T2 or between the first tier network T1 and the second tier network T2 is disconnected, the intelligence-defined optical tunnel network system 100 can perform optical signal transmission through the protection paths.

In this way, the intelligence-defined optical tunnel network system 100 with low latency, high bandwidth, and low power consumption can be realized. Provide property of reliability, expandability and wavelength reusability, and low wiring complexity. In addition, based on the characteristic of data rate transparency of the optical transmission system, the optical tunnel network can carry optical signals of any transmission rate within a certain range without changing the design of the optical component. Therefore, during upgrading the system, the intelligence-defined optical tunnel network system 100 only needs to replace the 10G DWDM transceiver with 100G DWDM transceiver for upgrading the wavelength transmission rate from 10 Gbit/s to 100 Gbit/s, which dramatically increases the flexibility of system transmission rate and saves a lot cost of hardware equipment for upgrading.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An intelligence-defined optical tunnel network system, comprising:
   at least three optical switch interconnect sub-systems independently connected to each other, wherein any two of the at least three optical switch interconnect sub-systems are a first optical switch interconnect sub-system and a second optical switch interconnect sub-system,
   wherein the first optical switch interconnect sub-system transmits a corresponding first lateral transmission optical signal to the second optical switch interconnect sub-system through a first line and a corresponding second lateral transmission optical signal to the second optical switch interconnect sub-system through a second line, and the second optical switch interconnect sub-system comprises:
     a failover sub-module, configured to output one of the first lateral transmission optical signal and the second lateral transmission optical signal in response to a selective signal; and
     when signal intensity of the first lateral transmission optical signal is lower than a threshold value, a micro-control unit, configured to output the selective signal to the failover sub-module in order to control the failover sub-module to output the second lateral transmission optical signal.

2. The intelligence-defined optical tunnel network system of claim 1, wherein the failover sub-module comprises:
   an optical switch, the optical switch configured to receive the first lateral transmission optical signal and the second lateral transmission optical signal from the first optical switch interconnect sub-system through the first line and the second line respectively, and output one of the first lateral transmission optical signal and the second lateral transmission optical signal in response to the selective signal; and
   a tap photodetector, the tap photodetector coupled to the optical switch, and configured to output a voltage value, so that the optical switch performs switch according to the voltage value.

3. The intelligence-defined optical tunnel network system of claim 2, wherein the micro-control unit is configured to monitor the value of the tap photodetector, and correspondingly output the selective signal to the optical switch when the voltage value is lower than a threshold value, so that the optical switch outputs the second lateral transmission optical signal.

4. The intelligence-defined optical tunnel network system of claim 2, wherein the micro-control unit is configured to execute a driver program to perform steps below:
   reading the voltage value of the tap photodetector;
   performing comparison between the voltage value and a threshold value;
   when the voltage value is larger than the threshold value, waiting for a time interval and then reading the voltage value of the tap photodetector again; and
   when the voltage value is lower than the threshold value, performing an unusual processing procedure.

5. The intelligence-defined optical tunnel network system of claim 4, wherein in the unusual processing procedure, the driver program further comprises the steps below:
   determining a number of times of unusual statuses based on system record of a system firmware;
   when the unusual status occurs for a first time, outputting the selective signal to switch the optical switch, and outputting an unusual status information signal to notify the system firmware that the tap photodetector occurs the unusual status for the first time; and
   when the unusual status occurs for a second time, stopping switching the optical switch, outputting the unusual status information signal to notify the system firmware that the tap photodetector occurs the unusual status for the second time and stopping reading the voltage value of the tap photodetector.

6. The intelligence-defined optical tunnel network system of claim 2, wherein the tap photodetector comprises a interrupt pin and the interrupt pin is connected to the micro-control unit, and the tap photodetector is configured to output a trigger signal to the micro-control unit when the voltage value is less than a threshold value; wherein the micro-control unit is configured to receive the trigger signal and execute a driver program to perform the steps below:
   reading the voltage value of the tap photodetector to confirm that the voltage value is lower than the threshold value;
   determining a number of unusual status according to system record of a system firmware when the voltage value is lower than the threshold value;
   when the unusual status occurs for a first time, outputting the selective signal to switch the optical switch, and outputting an unusual status information signal to notify the system firmware that the tap photodetector occurs the unusual status for the first time; and
   when the unusual status occurs for a second time, stopping switching the optical switch, outputting the unusual status information signal to notify the system firmware that the tap photodetector occurs the unusual status for the second time.

7. The intelligence-defined optical tunnel network system of claim 1, wherein the first optical switch interconnect sub-system and the second optical switch interconnect sub-system comprise respectively:
   an interconnection fabric module, configured to connect the first optical switch interconnect sub-system and the second optical switch interconnect sub-system to build the first line and the second line, wherein the interconnection fabric module transmits the first lateral transmission optical signal to the second optical switch interconnect sub-system in a first direction and the second lateral transmission optical signal to the second optical switch interconnect sub-system in a second direction differed with the first direction.

8. The intelligence-defined optical tunnel network system of claim 7, wherein the first optical switch interconnect sub-system and the second optical switch interconnect sub-system further comprise respectively:
   a receiving sub-module, configured to receive a plurality of first uplink transmission optical signals and a plurality of third uplink transmission optical signals from a plurality of optical add-drop sub-systems (OADS) respectively;
   an output sub-module, configured to output a plurality of second downlink transmission optical signals and a plurality of fourth downlink transmission optical signals to the optical add-drop sub-systems respectively; and an optical switching sub-module, coupled with the receiving sub-module, the output sub-module and the interconnection fabric module, and configured to transmit optical signals between the receiving sub-module, the output sub-module and the interconnection fabric module.

9. The intelligence-defined optical tunnel network system of claim 8, wherein the interconnection fabric module comprises:

a first upload terminal and a second upload terminal, a first east output terminal and a first west output terminal, the first upload terminal and the second upload terminal coupled to the first east output terminal and the first west output terminal respectively, and accordingly output the optical signals received from the optical switching sub-module.

10. The intelligence-defined optical tunnel network system of claim 9, wherein the interconnection fabric module further comprises:

a second east output terminal, a second west output terminal, a first east input terminal and a first west input terminal, wherein the first east input terminal and the first west input terminal receive the optical signals from the first west output terminal and the first east output terminal in the interconnection fabric module of the adjacent optical switch interconnect sub-system respectively; and a first interconnect splitter and a second interconnect splitter, wherein the first interconnect splitter configured to duplicate optical signal received from the first west input terminal, and output optical signal through the second east output terminal, and the second interconnect splitter configured to duplicate optical signal received from the first east input terminal, and output optical signal through the second west output terminal.

11. The intelligence-defined optical tunnel network system of claim 10, wherein the interconnection fabric module further comprises:

a second east input terminal and a second west input terminal, the second east input terminal and the second west input terminal configured to receive a lateral transmission optical signals from the second west output terminal and the second east output terminal in the interconnection fabric module of the adjacent optical switch interconnect sub-system respectively.

12. The intelligence-defined optical tunnel network system of claim 11, wherein the failover sub-module is coupled to the first interconnect splitter, the second interconnect splitter, the second east input terminal and the second west input terminal, and selectively outputs optical signals from the first interconnect splitter, the second interconnect splitter, the second east input terminal and the second west input terminal to the optical switching sub-module.

13. The intelligence-defined optical tunnel network system of claim 9, wherein the interconnection fabric module further comprises:

a first east protection output terminal and a first west protection output terminal; and a third interconnect splitter and a fourth interconnect splitter, the third interconnect splitter and the fourth interconnect splitter coupled to the first upload terminal and the second upload terminal respectively, and configured to duplicate the optical signals receive from the optical switching sub-module and output the optical signals through the first east protection output terminal and the first west protection output terminal respectively.

14. The intelligence-defined optical tunnel network system of claim 13, wherein the interconnection fabric module further comprises:

a second east protection output terminal and a second west protection output terminal;

a first east protection input terminal and a first west protection input terminal, configured to receive the optical signals from the first west protection output terminal and the first east protection output terminal in the interconnection fabric module of the adjacent optical switch interconnect sub-system respectively, and output the optical signals through the second west protection output terminal and the second east protection output terminal;

a third east protection output terminal and a third west protection output terminal;

a second east protection input terminal and a second west protection input terminal, configured to receive optical signals from the second west protection output terminal and the second east protection output terminal in the interconnection fabric module of the adjacent optical switch interconnect sub-system respectively, and output the optical signals through the third west protection output terminal and the third east protection output terminal;

a fourth east protection output terminal and a fourth west protection output terminal;

a third east protection input terminal and a third west protection input terminal, configured to receive optical signals from the third west protection output terminal and the third east protection output terminal in the interconnection fabric module of the adjacent optical switch interconnect sub-system respectively;

a fifth interconnect splitter and a sixth interconnect splitter, coupled to the failover sub-module, connected to the third east protection input terminal and the third west protection input terminal respectively, and configured to duplicate optical signals and output optical signals to the failover sub-module, through the fourth west protection output terminal and the fourth east protection output terminal; and a fourth east protection input terminal and a fourth west protection input terminal, wherein the failover sub-module is coupled to the fourth east protection input terminal and the fourth west protection input terminal, and selectively outputs optical signals from the fifth interconnect splitter, the sixth interconnect splitter, the fourth east protection input terminal and the fourth west protection input terminal to the optical switching sub-module.

15. A network system control method of controlling a network system, wherein the network system comprises at least three optical switch interconnect sub-systems independently connected to each other, wherein any two of the at least three optical switch interconnect sub-systems are a first optical switch interconnect sub-system and a second optical switch interconnect sub-system, said network system control method comprising:

transmitting a first lateral transmission optical signal from the first optical switch interconnect sub-system to the second optical switch interconnect sub-system through a first line;

transmitting a second lateral transmission optical signal from the first optical switch interconnect sub-system to the second optical switch interconnect sub-system through a second line;

when a signal intensity of the first lateral transmission optical signal is larger than a threshold value, outputting the first lateral transmission optical signal by a failover sub-module of the second optical switch interconnect sub-system; and when the signal intensity of the first lateral transmission optical signal is lower than the threshold value, outputting the second lateral transmission optical signal by the failover sub-module of the second optical switch interconnect sub-system.

16. The network system control method of claim 15, further comprising:

when signal intensity of the first lateral transmission optical signal is lower than the threshold value, outputting a selective signal to the failover sub-module by a micro-control unit of the second optical switch interconnect sub-system in order to control the failover sub-module to output the second lateral transmission optical signal.

17. The network system control method of claim 16, further comprising:

outputting a voltage value, according to the signal intensity of the first lateral transmission optical signal, to the micro-control unit by a tap photodetector of the failover sub-module; and switching an optical switch of the failover sub-module according to the selective signal, in order to output the second lateral transmission optical signal.

18. The network system control method of claim 17, further comprising:

reading the voltage value of the tap photodetector by the micro-control unit;

performing comparison between the voltage value and the threshold value by the micro-control unit;

when the voltage value is larger than the threshold value, waiting for a time interval and then reading the voltage value of the tap photodetector by the micro-control unit again; and when the voltage value is lower than the threshold value, performing an unusual processing procedure by the micro-control unit.

19. The network system control method of claim 18, further comprising:

in the unusual processing procedure, determining a number of times of unusual status based on system record of a system firmware by the micro-control unit;

when the unusual status occurs for a first time, outputting the selective signal by the micro-control unit to switch the optical switch and outputting an unusual status information signal to notify the system firmware that the tap photodetector occurs the unusual status for the first time; and when the unusual status occurs for a second time stopping switching the optical switch and outputting the unusual status information signal to notify the system firmware that the tap photodetector occurs the unusual status for the second time by the micro-control unit and stopping reading the voltage value of the tap photodetector.

20. The network system control method of claim 17, further comprising:

outputting a trigger signal to the micro-control unit by the tap photodetector when the voltage value is lower than a threshold value;

in response to the trigger signal, reading the voltage value of the tap photodetector by the micro-control unit to confirm that the voltage value is lower than the threshold value;

determining a number of unusual status by the micro-control unit according to system record of a system firmware;

when the unusual status occurs for a first time, outputting the selective signal to switch the optical switch and outputting an unusual status information signal to notify the system firmware that the tap photodetector occurs the unusual status for the first time by the micro-control unit; and when the unusual status occurs for a second time, stopping switching the optical switch and outputting the unusual status information signal to notify the system firmware that the tap photodetector occurs the unusual status for the second time by the micro-control unit.

* * * * *